United States Patent
Ha et al.

(10) Patent No.: US 12,267,644 B2
(45) Date of Patent: Apr. 1, 2025

(54) APPARATUS

(71) Applicant: LG Display Co., Ltd., Seoul (KR)

(72) Inventors: YoungWook Ha, Paju-si (KR); Chiwan Kim, Paju-si (KR); SeungRyull Park, Paju-si (KR); SangWoo Jin, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 235 days.

(21) Appl. No.: 17/977,378

(22) Filed: Oct. 31, 2022

(65) Prior Publication Data

US 2023/0217161 A1 Jul. 6, 2023

(30) Foreign Application Priority Data

Dec. 31, 2021 (KR) .................. 10-2021-0194786

(51) Int. Cl.
| | |
|---|---|
| H04R 5/02 | (2006.01) |
| H04R 1/02 | (2006.01) |
| H04R 1/28 | (2006.01) |
| H04R 1/40 | (2006.01) |
| H04R 3/12 | (2006.01) |
| H04R 17/00 | (2006.01) |

(52) U.S. Cl.
CPC .............. *H04R 1/403* (2013.01); *H04R 1/028* (2013.01); *H04R 1/2896* (2013.01); *H04R 3/12* (2013.01); *H04R 17/00* (2013.01); *H04R 2400/03* (2013.01); *H04R 2400/11* (2013.01); *H04R 2499/15* (2013.01)

(58) Field of Classification Search
None
See application file for complete search history.

(56) References Cited

U.S. PATENT DOCUMENTS

| | | | |
|---|---|---|---|
| 11,019,430 B2* | 5/2021 | Ham | ............... H04R 9/063 |
| 2018/0317000 A1 | 11/2018 | Ham et al. | |
| 2019/0116406 A1 | 4/2019 | Ahn et al. | |
| 2020/0059733 A1 | 2/2020 | Shin et al. | |
| 2020/0177719 A1 | 6/2020 | Kim et al. | |
| 2020/0182545 A1 | 6/2020 | Oh et al. | |
| 2020/0280796 A1 | 9/2020 | Lee et al. | |
| 2020/0314552 A1 | 10/2020 | Kim et al. | |
| 2021/0200503 A1 | 7/2021 | Lee et al. | |
| 2021/0407488 A1 | 12/2021 | Choi et al. | |

FOREIGN PATENT DOCUMENTS

| | | |
|---|---|---|
| JP | 2020-167655 A | 10/2020 |
| JP | 2021-111966 A | 8/2021 |
| JP | 2021-164165 A | 10/2021 |
| JP | 2021-197737 A | 12/2021 |

\* cited by examiner

*Primary Examiner* — Rasha S Al Aubaidi
(74) *Attorney, Agent, or Firm* — Birch, Stewart, Kolasch & Birch, LLP

(57) ABSTRACT

An apparatus can include a display member configured to display an image, a vibration apparatus disposed at a rear surface of the display member, a supporting frame disposed at a rear surface of the vibration apparatus, and an adhesive member disposed between the supporting frame and the rear surface of the display member. In addition, the adhesive member and/or supporting frame is spaced apart from the vibration apparatus, and the vibration apparatus is configured to vibrate in a direction toward the display member.

34 Claims, 13 Drawing Sheets

APPARATUS

CROSS-REFERENCE TO RELATED APPLICATIONS

This application claims priority to the Korean Patent Application No. 10-2021-0194786 filed in the Republic of Korea on Dec. 31, 2021, the entirety of which is hereby incorporated by reference as if fully set forth herein.

BACKGROUND

Technical Field

The present disclosure relates to an apparatus for outputting a sound.

Discussion of the Related Art

Some apparatuses include a display member for displaying an image and a sound apparatus for outputting a sound associated with the image displayed by the display member. However, screen sizes are becoming larger, but the demand for lightness and thinness is increasing. Since there should be a sufficient amount of space where a sound apparatus is embedded, such as a speaker for outputting a sound, it is difficult to produce an apparatus that is still light and thin. Also, a sound generated by a sound apparatus embedded in an apparatus is output in a direction toward a rear surface or a lateral surface of a main body of the apparatus instead of a front surface of a display member, and due to this, the sound does not travel toward a viewer or a user, watching an image, of a forward region with respect to the front surface of the display member, causing a problem where the immersion experience of a viewer watching an image is hindered. For example, sound quality and fidelity can become impaired, since the sound waves are often emitted out of the rear or sides of the apparatus and arrive at the user indirectly after being reflected off of objects or being blocked by portions of the apparatus itself.

Moreover, a speaker applied to apparatuses can be, for example, an actuator including a coil and a magnet. However, in a situation where the actuator including a coil and a magnet is applied to apparatuses, there is a drawback in that a thickness is relatively thick. For example, even if a display panel is thin, large speakers attached to the back of the device can significantly hinder the overall aesthetic and cause the device to be rather cumbersome. Thus, piezoelectric devices enabling implementation of a thin thickness are attracting much attention. Because piezoelectric devices have a fragile characteristic, the piezoelectric devices are easily damaged by an external impact, and due to this, there is a problem in that the reliability of sound reproduction is low and the lifespan of the device becomes shortened.

SUMMARY OF THE DISCLOSURE

Accordingly, the inventors have recognized the above-described problems and have performed various experiments for allowing sound to travel in a forward direction of an apparatus and enhancing the quality of the sound. Through the various experiments, the inventors have invented a new apparatus for allowing sound to travel in a forward direction of the apparatus and enhancing a sound pressure level characteristic and/or a sound characteristic.

An aspect of the present disclosure is directed to providing an apparatus which can vibrate a display member to output a sound in a forward direction of the display member, thereby enhancing a sound.

Additional advantages and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description and claims hereof as well as the appended drawings.

To achieve these and other aspects of the inventive concepts, as embodied and broadly described, an apparatus includes a display member configured to display an image, a vibration apparatus at a rear surface of the display member, a supporting frame at a rear surface of the vibration apparatus, and an adhesive member between the supporting frame and the rear surface of the display member, the adhesive member and/or supporting frame being spaced apart from the vibration apparatus, the vibration apparatus is configured to vibrate in a direction toward the display member. The apparatus may be a display apparatus.

In another aspect, an apparatus includes a display member configured to display an image, a supporting frame at a rear surface of the display member, an adhesive member between the supporting frame and the rear surface of the display member, the adhesive member including a hollow portion, and a vibration apparatus disposed at or in the hollow portion of the adhesive member and configured to vibrate the display member. The apparatus may be a display apparatus.

In another aspect, an apparatus according to some embodiments of the present disclosure comprises a display member configured to display a video, a supporting frame, a vibration apparatus disposed between the display member and the supporting frame, and an adhesive member disposed between the supporting frame and the display member, the adhesive member being spaced apart from the vibration apparatus. The apparatus may be a display apparatus.

According to an embodiment of the present disclosure, an apparatus may be provided which vibrates a display member to output a sound in a forward direction of the display member, and thus a sound characteristic and/or a sound pressure level characteristic are/is enhanced.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing description and the following description of the present disclosure are examples and explanatory, and are intended to provide further explanation of the disclosures as claimed.

BRIEF DESCRIPTION OF THE DRAWINGS

The accompanying drawings, which are included to provide a further understanding of the disclosure, are incorporated in and constitute a part of this disclosure, illustrate aspects and embodiments of the disclosure and together with the description serve to explain principles of the disclosure.

Figure 1:
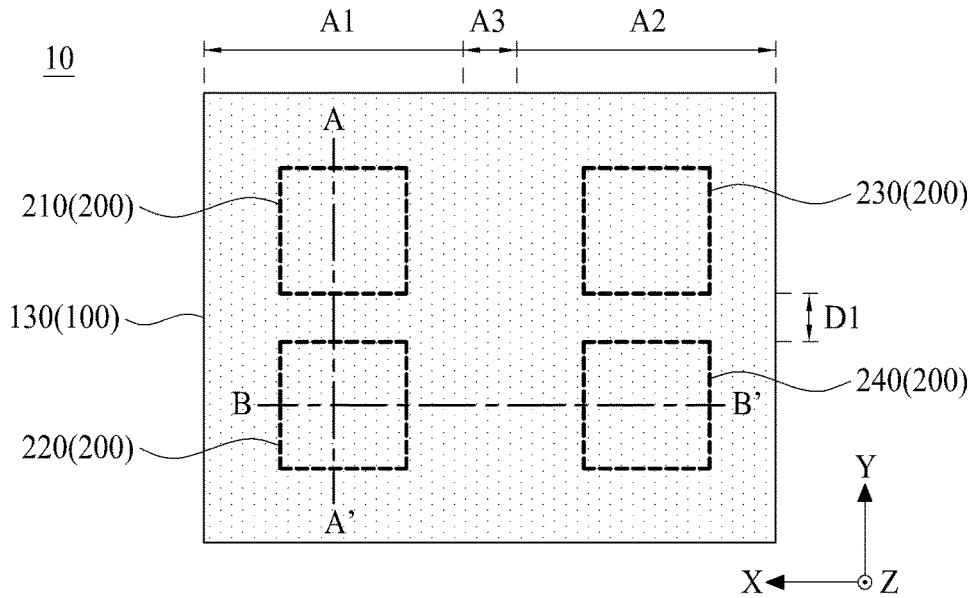
FIG. 1 illustrates an apparatus according to an embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction thereof can be exaggerated for clarity, illustration, and convenience.

DETAILED DESCRIPTION OF THE EMBODIMENTS

Reference is now made in detail to embodiments of the present disclosure, examples of which can be illustrated in the accompanying drawings. In the following description, when a detailed description of well-known functions or configurations may unnecessarily obscure aspect of the present disclosure, the detailed description thereof may be omitted for brevity. The progression of processing steps and/or operations described is an example; however, the sequence of steps and/or operations is not limited to that set forth herein and can be changed, with the exception of steps and/or operations necessarily occurring in a particular order.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and can be thus different from those used in actual products.

Advantages and features of the present disclosure, and implementation methods thereof, are clarified through the embodiments described with reference to the accompanying drawings. The present disclosure can, however, be embodied in different forms and should not be construed as limited to the embodiments set forth herein. Rather, these embodiments are provided so that this disclosure is thorough and complete, and fully conveys the scope of the present disclosure to those skilled in the art. Furthermore, the present disclosure is only defined by claims and their equivalents.

The shapes, sizes, areas, ratios, angles, numbers, and the like disclosed in the drawings for describing embodiments of the present disclosure are merely an example, and thus, the present disclosure is not limited to the illustrated details.

When the term "comprise," "have," "include," "contain," "constitute," "make up of," "formed of," and the like is used, one or more other elements can be added unless a term, such as "only" or the like is used. The terms used in the present disclosure are merely used in order to describe particular embodiments, and are not intended to limit the scope of the present disclosure. The terms used herein are merely used in order to describe example embodiments, and are not intended to limit the scope of the present disclosure. The terms of a singular form can include plural forms unless the context clearly indicates otherwise. The word "exemplary" is used to mean serving as an example or illustration. Embodiments are example embodiments. Aspects are example aspects. Any implementation described herein as an "example" is not necessarily to be construed as preferred or advantageous over other implementations.

In one or more aspects, an element, feature, or corresponding information (e.g., a level, range, dimension, size, or the like) is construed as including an error or tolerance range even where no explicit description of such an error or tolerance range is provided. An error or tolerance range may be caused by various factors (e.g., process factors, internal or external impact, noise, or the like). Further, the term "may" encompasses all the meanings of the term "can."

In describing a positional relationship, where the positional relationship between two parts is described, for example, using "on," "over," "under," "above," "below," "beneath," "near," "close to," or "adjacent to," "beside," "next to," or the like, one or more other parts can be located between the two parts unless a more limiting term, such as "immediate(ly)," "direct(ly)," or "close(ly)," is used. For example, when a structure is described as being positioned "on," "over," "under," "above," "below," "beneath," "near," "close to," or "adjacent to," "beside," or "next to" another structure, this description should be construed as including a situation in which the structures contact each other as well as a situation in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

In describing a temporal relationship, when the temporal order is described as, for example, "after," "subsequent," "next," "before," "preceding," "prior to," or the like, a situation that is not consecutive or not sequential can be included unless a more limiting term, such as "just," "immediate(ly)," or "direct(ly)," is used.

It is understood that, although the term "first," "second," or the like can be used herein to describe various elements, these elements should not be limited by these terms. These terms are only used to distinguish one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure. The terms "first," "second," and the like may be used to distinguish components from each other, but the functions or structures of the components are not limited by ordinal numbers or component names in front of the components.

In describing elements of the present disclosure, the terms "first," "second," "A," "B," "(a)," "(b)," or the like can be used. These terms are intended to identify the corresponding element(s) from the other element(s), and these are not used to define the essence, basis, order, or number of the corresponding elements should not be limited by these terms.

For the expression that an element or layer is "connected," "coupled," or "adhered" to another element or layer, the element or layer can not only be directly connected, coupled, or adhered to another element or layer, but also be indirectly connected, coupled, or adhered to another element or layer with one or more intervening elements or layers disposed or interposed between the elements or layers, unless otherwise specified.

For the expression that an element or layer "contacts," "overlaps," or the like with another element or layer, the element or layer can not only directly contact, overlap, or the like with another element or layer, but also indirectly contact, overlap, or the like with another element or layer with one or more intervening elements or layers disposed or interposed between the elements or layers, unless otherwise specified.

The term "at least one" should be understood as including any and all combinations of one or more of the associated listed items. For example, the meaning of "at least one of a first item, a second item, and a third item" denotes the combination of items proposed from two or more of the first item, the second item, and the third item as well as only one of the first item, the second item, or the third item.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C. Furthermore, an expression "element A/element B" may be understood as element A and/or element B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two.

In one or more aspects, the phrases "each other" and "one another" may be used interchangeably simply for convenience unless stated otherwise. For example, an expression "different from each other" may be understood as being different from one another. In another example, an expression "different from one another" may be understood as being different from each other. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise.

Features of various embodiments of the present disclosure can be partially or wholly coupled to or combined with each other, and can be variously inter-operated, linked or driven together. The embodiments of the present disclosure can be carried out independently from each other, or can be carried out together in a co-dependent or related relationship. In one or more aspects, the components of each apparatus according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

Hereinafter, various embodiments of the present disclosure are described in detail with reference to the accompanying drawings. In addition, for convenience of description, a scale, dimension, size, and thickness of each of the elements illustrated in the accompanying drawings ca differ from ac actual scale, dimension, size, and thickness, and thus, is not limited to a scale, dimension, size, and thickness illustrated in the drawings.

Figure 2:
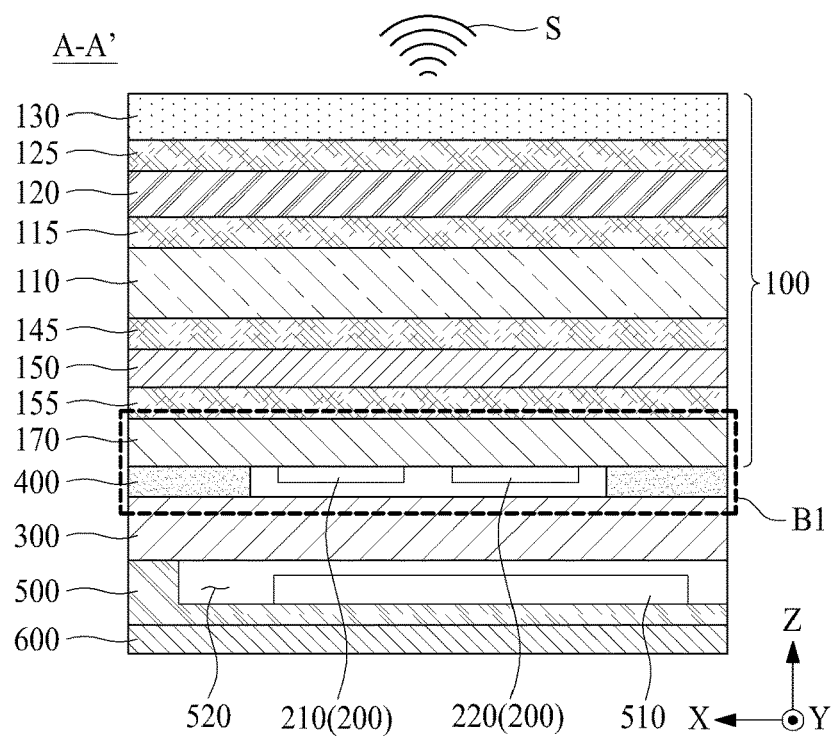
FIG. 2 is a cross-sectional view taken along line A-A' of FIG. 1 according to an embodiment of the present disclosure.
Figure 3:
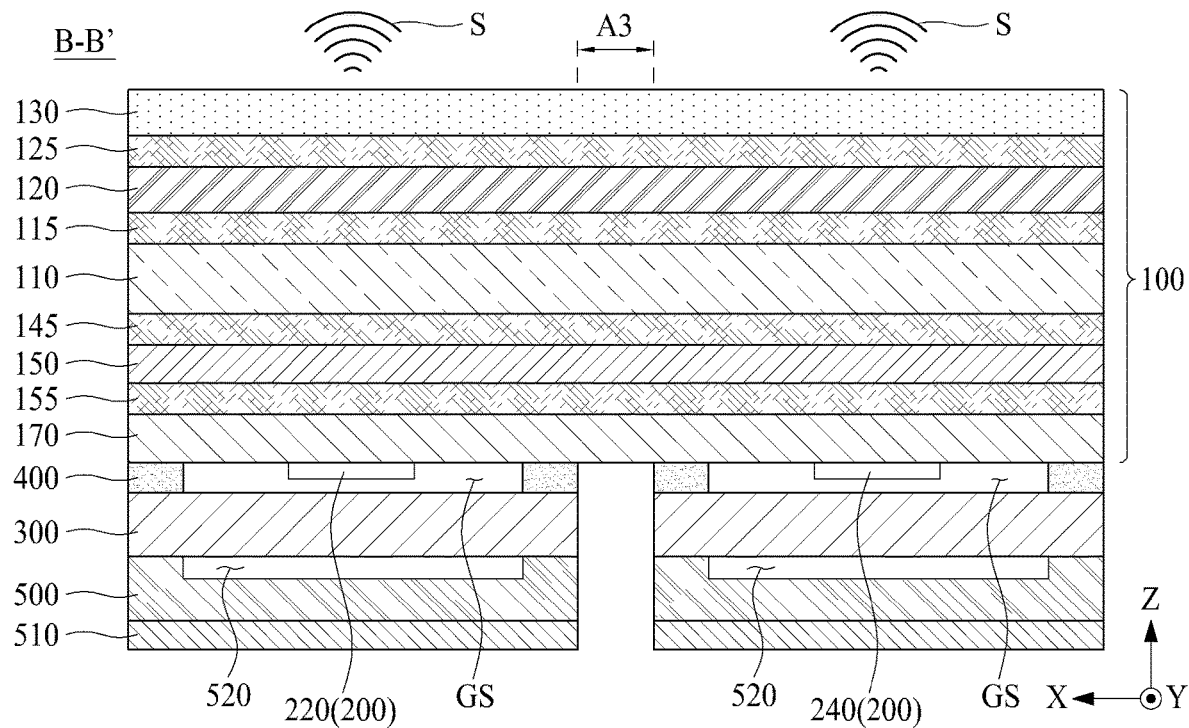
FIG. 3 is a cross-sectional view taken along line B-B' of FIG. 1 according to an embodiment of the present disclosure.

FIG. 1 illustrates an apparatus according to an embodiment of the present disclosure. FIG. 2 is a cross-sectional view taken along line A-A' of FIG. 1. FIG. 3 is a cross-sectional view taken along line B-B' of FIG. 1.

With reference to FIGS. 1 to 3, an apparatus 10 according to an embodiment of the present disclosure can be a display apparatus, but embodiments of the present disclosure are not limited thereto.

The display apparatus can include a display panel, which includes a plurality of pixels configuring a black/white or color image, and a driver for driving the display panel. Each of the pixels can be a subpixel which implements one of a plurality of colors configuring a color image. The apparatus according to an embodiment of the present disclosure can include a set apparatus or a set device (or a set apparatus) such as a notebook computer, a television, a computer monitor, an equipment apparatus including an automotive apparatus or another type apparatus for vehicles, or a mobile apparatus such as a smartphone, a foldable phone, a rollable phone, or an electronic pad, or the like, which is a complete product (or a final product) including a liquid crystal display panel or an organic light emitting display panel, or the like.

The apparatus 10 according to an embodiment of the present disclosure can include a display member 100, a vibration apparatus 200, a supporting frame 300, and an adhesive member 400.

The display member 100 can display an image, for example, an electronic image, a digital image, a still image, or a video image, or the like. For example, the display member 100 can include a display panel 110 which can display an image by outputting light.

The display panel 110 can be a curved display panel or one of all types of display panels, such as a liquid crystal display panel, an organic light emitting display panel, a quantum dot light emitting display panel, a micro light emitting diode display panel, and an electrophoretic display panel. The display panel 110 can be a flexible display panel. For example, the display panel 110 can be a flexible light emitting display panel, a flexible electrophoretic display panel, a flexible electro-wetting display panel, a flexible light emitting diode display panel, or a flexible quantum dot light emitting display panel, but embodiments of the present disclosure are not limited thereto.

The display panel 110 according to an embodiment of the present disclosure can include a display area which displays an image based on driving of a plurality of pixels. The display panel 110 can include a non-display area which surrounds the display area, but embodiments of the present disclosure are not limited thereto. The display area can include a first display area A1, a second display area A2, and a third display area A3 between the first display area A1 and the second display area A2. For example, with respect to a first direction X, the first display area A1 can be a left display area, the second display area A2 can be a right display area, and the third display area A3 can be a center (or middle) display area or a folding display area. The display member 100 or the display panel 110 can be bent or folded at a certain curvature with respect to the third display area A3, and thus, the apparatus 10 according to an embodiment of the present disclosure can be a foldable apparatus or a flexible apparatus. Hereinafter, an example where the apparatus 10 is the foldable apparatus will be described.

The display panel 110 according to an embodiment of the present disclosure can include a first substrate, a second substrate, and a liquid crystal layer. The first substrate can be an upper substrate or a thin film transistor (TFT) array substrate. For example, the display panel 110 can include the first substrate including a TFT which is a switching element for adjusting a light transmittance of each pixel, the second substrate including a color filter and/or a black matrix, or the like, and a liquid crystal layer formed between the first substrate and the second substrate. For example, the first substrate can include a pixel array portion (or a display portion or a display area) including a plurality of pixels which are respectively provided in a plurality of pixel areas configured by intersections between a plurality of gate lines and/or a plurality of data lines. Each of the plurality of pixels can include a TFT connected to a gate line and/or a data line, a pixel electrode connected to the TFT, and a common electrode which is provided adjacent to the pixel electrode and is supplied with a common voltage.

The first substrate can further include a pad portion provided at a first periphery (or a first non-display portion) thereof and a gate driving circuit provided at a second periphery (or a second non-display portion) thereof.

The pad portion can transfer a signal, supplied from the outside, to the pixel array portion and/or the gate driving circuit. For example, the pad portion can include a plurality of data pads connected to a plurality of data lines through a plurality of data link lines and/or a plurality of gate input pads connected to the gate driving circuit through a gate control signal line. For example, a size of the first substrate can be greater than the second substrate, but embodiments of the present disclosure are not limited thereto.

The gate driving circuit can be embedded (or integrated) into the second periphery of the first substrate and can be connected to the plurality of gate lines. For example, the gate driving circuit can be implemented with a shift register including a transistor, which is formed through the same process as the TFT provided in the pixel area. According to another embodiment of the present disclosure, the gate driving circuit can be implemented as an integrated circuit (IC) and can be included in a panel driving circuit, without being embedded into the first substrate.

The second substrate can be a lower substrate or a color filter array substrate. For example, the second substrate can include a pixel pattern (or a pixel defining pattern, including an opening area overlapping the pixel area formed in the second substrate, and a color filter layer formed at the opening area. The second substrate can have a size which is smaller than the first substrate, but embodiments of the present disclosure are not limited thereto. For example, the second substrate can overlap a portion, other than the first periphery, of the first substrate. The second substrate can be bonded to a portion, other than the first edge, of the first substrate with a liquid crystal layer therebetween by a sealant.

The liquid crystal layer can be disposed between the first substrate and the second substrate. The liquid crystal layer can include a liquid crystal including liquid crystal molecules where an alignment direction thereof is changed based on an electric field generated by the common voltage and a data voltage applied to a pixel electrode for each pixel.

The display panel 110 according to an embodiment of the present disclosure can drive the liquid crystal layer based on the electric field which is generated in each pixel by the data voltage and the common voltage applied to each pixel, and thus, can display an image based on light passing through the liquid crystal layer.

In the display panel 110 according to another embodiment of the present disclosure, the first substrate can be implemented as the color filter array substrate, and the second substrate can be implemented as the TFT array substrate. For example, the display panel 30 according to another embodiment of the present disclosure can have a type where the display panel 110 according to an embodiment of the present disclosure is reversed. For example, a pad portion of the display panel 110 according to another embodiment of the present disclosure can be covered by a separate mechanism or a separate structure.

When the display panel 110 is an organic light emitting display panel, the display panel 30 can include a plurality of gate lines, a plurality of data lines, and a plurality of pixels respectively provided in a plurality of pixel areas defined by intersections of the gate lines and the data lines. In addition, the display panel 30 can include an array substrate including a TFT which is an element for selectively applying a voltage to each of the pixels, an organic light emitting device layer on the array substrate, and an encapsulation portion or an encapsulation substrate disposed over the array substrate to overlay the organic light emitting device layer. The encapsulation substrate can protect the TFT and the organic light emitting device layer from an external impact and can prevent water or oxygen from penetrating into the organic light emitting device layer. In addition, the organic light emitting device layer provided over the array substrate can be changed to an inorganic light emitting layer (for example, a nano-sized material layer, a quantum dot, or the like). As another example, the organic light emitting device layer provided over the array substrate can be changed to a micro light emitting diode.

The display panel 110 according to an embodiment of the present disclosure can display an image with a certain type of configuration, such as a top emission type, a bottom emission type, or a dual emission type, based on a structure of a pixel array portion which includes an anode electrode, a cathode electrode, and a light emitting device and includes a plurality of pixels. In the top emission type, visible light emitted from the pixel array portion can be irradiated in a forward direction of a base substrate to allow an image to be displayed, and in the bottom emission type, the visible light emitted from the pixel array portion can be irradiated in a rearward region of the base substrate to allow an image to be displayed.

The display panel 110 according to an embodiment of the present disclosure can include a pixel array portion disposed over a substrate (or a flexible substrate). The pixel array portion can include a plurality of pixels which display an image based on a signal supplied through each of signal lines. The signal lines can include a gate line, a data line, and a pixel driving power line, or the like, but embodiments of the present disclosure are not limited thereto.

The flexible substrate of the display panel 110 can include a plastic material, but embodiments of the present disclosure are not limited thereto. The flexible substrate of the display panel 110 can include polyimide (PI), polyethylene terephthalate (PET), polyethylene naphthalate (PEN), polycarbonate (PC), polyethersulfone (PES), polyarylate (PAR), polysulfone (PSF), and cyclic-olefin copolymer (COC), or the like, but embodiments of the present disclosure are not limited thereto, and the flexible substrate can be configured as thin glass capable of being folded or bent.

Each of the plurality of pixels can include a pixel circuit layer including a driving TFT provided at a pixel area which is configured by a plurality of gate lines and/or a plurality of data lines, an anode electrode electrically connected to the driving TFT, a light emitting device disposed over the anode electrode, and a cathode electrode electrically connected to the light emitting device.

The driving TFT can be configured at a transistor region of each pixel area provided at the substrate. The driving TFT can include a gate electrode, a gate insulation layer, a semiconductor layer, a source electrode, and a drain electrode. The semiconductor layer of the driving TFT can include silicon such as amorphous silicon (a-Si), polysilicon (poly-Si), or low temperature poly-Si, or the like, or can include oxide such as indium-gallium-zinc-oxide (IGZO), or the like, but embodiments of the present disclosure are not limited thereto.

The anode electrode (or a pixel electrode) can be provided at the opening region disposed in each pixel area and can be electrically connected to the driving TFT.

The light emitting device according to an embodiment of the present disclosure can include an organic light emitting device layer provided at the anode electrode. The organic light emitting device layer can be implemented so that pixels emit light of the same color (for example, white light) for each pixel or emit lights of different colors (for example, red light, green light, and blue light) for each pixel. The cathode electrode (or a common electrode) can be connected to the organic light emitting device layer provided at each pixel area in common. For example, the organic light emitting device layer can include a single structure, where includes the same color for each pixel, or a stack structure which includes two or more structures. As another embodiment of the present disclosure, the organic light emitting device layer can include a stack structure which includes two or more structures including one or more different colors for each pixel. The two or more structures including one or more different colors can be configured with one or more of blue, red, yellow-green, and green or a combination thereof, but embodiments of the present disclosure are not limited thereto. For example, an embodiment of the combination can be blue and red, red and yellow-green, red and green, and red/yellow/green, or the like, but embodiments of the present disclosure are not limited thereto. In addition, an embodiment of the present disclosure can be applied regardless of a stack order thereof. A stack structure including two or more structures having the same color or one or more different colors can further include a charge generating layer between two or more structures. The charge generating layer can have a PN junction structure and can include an N-type charge generating layer and a P-type charge generating layer.

The light emitting device according to another embodiment of the present disclosure can include a micro light emitting diode device which is electrically connected to each of the anode electrode and the cathode electrode. The micro light emitting diode device can be a light emitting diode implemented as an IC (integrated circuit) type or a chip type. The micro light emitting diode device can include a first terminal electrically connected to the anode electrode and a second terminal electrically connected to the cathode electrode. The cathode electrode can be connected to a second terminal of the micro light emitting diode device provided at each pixel area in common. As another embodiment of the present disclosure, the light emitting device can include a quantum dot light emitting layer, but embodiments of the present disclosure are not limited thereto.

The encapsulation portion can be formed over the substrate to surround the pixel array portion, and thus, can prevent oxygen or water from penetrating into the light emitting device layer of the pixel array portion. The encapsulation portion according to an embodiment of the present disclosure can be formed in a multi-layer structure where an organic material layer and an inorganic material layer are alternately stacked, but embodiments of the present disclosure are not limited thereto. The inorganic material layer can prevent oxygen or water from penetrating into the light emitting device layer of the pixel array portion. The organic material layer can be formed to have a thickness which is relatively thicker than the inorganic material layer, to overlay particles occurring in a manufacturing process, but embodiments of the present disclosure are not limited thereto. For example, the encapsulation portion can include a first inorganic layer, an organic layer over the first inorganic layer, and a second inorganic layer over the organic layer. The organic layer can be a particle covering (or overlaying) layer, but the terms are not limited thereto. Hereinafter, an example where the display panel 110 is an organic light emitting display panel will be described, but embodiments of the present disclosure are not limited thereto.

The display member 100 according to an embodiment of the present disclosure can further include a front member 130 and a rear member 170.

The front member 130 can be disposed at a front surface (or a forward surface) of the display panel 110. The front member 130 can transfer an image displayed by the display panel 110 to the outside and can protect the display panel 110. For example, the front member 130 can protect the display panel 110 from an external impact or stress and can prevent the occurrence of damage. The front member 130 can be implemented with a ductile plastic-based cover capable of being folded or bent for the thinness and flexibility of the apparatus 10. For example, the front member 130 can be a cover window or a window cover, or the like, but embodiments of the present disclosure are not limited thereto.

According to an embodiment of the present disclosure, a protection film can be further disposed over the front surface of the front member 130. The front member 130 can be formed to have a thin thickness of several tens μm, and due to this, the front member 130 can be damaged by an external small impact or continuous folding. The protection film can protect the front member 130 from a compression stress and a tensile stress based on an external impact or continuous folding. In addition, when glass powders or shards occur because the front member 130 is damaged by an external impact or a stress, the protection film can prevent the glass powders or shards from being scattered. For example, the protection film can include a film such as polyethylene terephthalate, but embodiments of the present disclosure are not limited thereto. For example, the protection film can include triacetylcellulose, cycloolefin polymer (COP), or a combination material thereof.

According to another embodiment of the present disclosure, a touch panel configuring a touch sensor can be further disposed between the display panel 110 and the front member 130. For example, the touch panel can include a touch electrode layer which is provided over the display panel 110 and includes a touch electrode for sensing a user touch applied to the display panel 110. The touch electrode layer can sense a capacitance variation of the touch electrode based on the user touch. For example, a mutual-capacitance type where a plurality of touch driving electrodes and a plurality of touch sensing electrodes are configured to intersect or a self-capacitance type where only a plurality of touch sensing electrodes are arranged can be applied, and an adhesive layer can be disposed over a top surface (or an upper surface) or a bottom surface (or a lower surface) and can be attached on and fixed to an upper element or a lower element. The touch panel can be disposed over an encapsulation portion of the display panel 110, or can be disposed at a rear surface of a pixel array portion or in the pixel array portion.

The rear member 170 can be can be disposed under or behind the display panel 110. The rear member 170 can be configured or disposed to support the display panel 110. For example, the rear member 170 can additionally support a flexible substrate so that the flexible substrate configuring the display panel 30 does not overlay and can protect elements disposed over the flexible substrate from external moisture, heat, and impact.

The rear member 170 can include a metal material. For example, the rear member 170 can include a metal material such as stainless steel (SUS), stainless steel (SUS) including other metals such as nickel (Ni), iron (Fe), aluminum (Al)-based, or magnesium (Mg), but embodiments of the present disclosure are not limited thereto. For example, when the rear member 170 includes stainless steel (SUS), the stainless steel (SUS) can have a high restoring force and high stiffness (e.g., a memory metal), and thus, can maintain high stiffness even when a thickness of the rear member 170 is reduced. Therefore, the rear member 170 can support the display panel 110 and can decrease a total thickness of the apparatus 10, and thus, can reduce a curvature radius of a folding area. For example, the rear member 170 is not limited thereto and the rear member 170 can include a polymer such as polymethyl methacrylate (PMMA), polycarbonate (PC), polyvinylalcohol (PVA), acrylonitrile-butadiene-styrene (ABS), polyethylene terephthalate (PET), silicone, or polyurethane (PU).

The rear member 170 can be separated in a region overlapping a third display area A3 of the display panel 110. For example, the rear member 170 can be configured to overlap each of the first display area A1 and the second display area A2, other than the third display area A3, of the display panel 110.

The display member 100 according to an embodiment of the present disclosure can further include a polarization member 120 between the front member 130 and the display panel 110.

The polarization member 120 can polarize light, emitted from the display panel 110, at a polarization angle. The polarization member 120 can discharge light, polarized at the polarization angle, to the outside. The polarization member 120 can have a function of preventing the reflection of light, except the light polarized at the polarization angle, of external light. For example, the polarization member 120 can transmit only light, traveling in a polarization direction, of the external light incident from the outside and can absorb the other light, and light passing through the polarization member 120 can be reflected by the display panel 110 and can be incident on the polarization member 120 again. At this time, a polarization direction of the reflected external light can be changed, and thus, the light which is incident on the polarization member 120 again can be absorbed by the polarization member 120 and may not be output to the outside, thereby preventing the reflection of the external light. Accordingly, the polarization member 120 can prevent the reflection of light input from the outside to secure the visibility of the display panel 110.

According to an embodiment of the present disclosure, the polarization member 120 can include a circular polarizer. When the polarization member 120 is the circular polarizer, a phase difference film (or a phase retardation film) disposed between the display panel 110 and the polarization member 120 can be further configured. For example, a λ/4 phase retardation film can be further configured between the polarization member 120 and the display panel 110.

According to an embodiment of the present disclosure, the polarization member 120 can be attached on the display panel 110 by a first adhesive member 115. The front member 130 can be attached on the polarization member 120 by a second adhesive member 125.

The display member 100 according to an embodiment of the present disclosure can further include a middle member 150 between the display panel 110 and the rear member 170.

The middle member 150 can be attached on a rear surface (or a backside surface) of the display panel 110 by a third adhesive member 145, and thus, can primarily support the display panel 110. For example, the middle member 150 can support the display panel 110 together with the rear member

170. When the display member 100 (or the display panel 110) is a foldable display member, the middle member 150 can maintain a constant curvature of the display member 100 (or the display panel 110) when the foldable display member is folded in multi-folding and can prevent the occurrence of creases or ridges forming in a top surface (or an upper surface) of the display panel 110. For example, the middle member 150 can be a first rear supporting member, a first supporting member, a first supporting substrate, or a first supporting plate, but embodiments of the present disclosure are not limited thereto.

The middle member 150 according to an embodiment of the present disclosure can include polyimide (PI), polyethylene terephthalate (PET), polyethylene naphthalate (PEN), polycarbonate (PC), polyethersulfone (PES), polyarylate (PAR), polysulfone (PSF), and cyclic-olefin copolymer (COC), or the like, but embodiments of the present disclosure are not limited thereto, and middle member 150 can be configured as thin glass capable of being folded or bent.

The rear member 170 can be attached on a rear surface (or a backside surface) of the middle member 150 by a fourth adhesive member 155, and thus, can support the display panel 110 together with the middle member 150. For example, the rear member 170 can be a second rear supporting member, a second supporting member, a second supporting substrate, or a second supporting plate, but embodiments of the present disclosure are not limited thereto.

The vibration apparatus 200 can be disposed at a rear surface of the display member 100. The vibration apparatus 200 can vibrate the display member 100 at the rear surface of the display member 100 to provide a user with a sound S and/or a haptic feedback based on a vibration of the display member 100. According to an embodiment of the present disclosure, the vibration apparatus 200 can vibrate based on a vibration driving signal synchronized with an image displayed by the display member 100 to vibrate the display member 100. For example, the vibration apparatus 200 can transform the display member 100 into functioning as a large speaker by controlling the vibration apparatus 200 to vibrate in a direction toward the display member (e.g., the vibration apparatus 200 can move back and forth in a direction that is perpendicular with the rear of the display member in order to also vibrate the display member in a corresponding manner). Also, the vibration apparatus 200 can output audio information that is synchronized with video displayed by the display member.

The vibration apparatus 200 can be configured to overlap with one or more of the first and second display areas A1 and A2, except for the third display area A3, of the display member 100 or the apparatus 10 (e.g., since the vibration apparatus 200 is not located in the third display A3, this can facilitate bending of the apparatus 10 and protect the vibration apparatus 200 from damage or cracks).

The vibration apparatus 200 according to an embodiment of the present disclosure can include a plurality of vibration apparatuses 210, 220, 230, and 240. For example, the vibration apparatus 200 can include first to fourth vibration apparatuses 210, 220, 230, and 240.

The first and second vibration apparatuses 210 and 220 can be disposed at the rear surface of the display member 100 to overlap the first display area A1. For example, the first and second vibration apparatuses 210 and 220 can be disposed at or connected to the rear surface of the rear member 170 to overlap the first display area A1.

The third and fourth vibration apparatuses 230 and 240 can be disposed at the rear surface of the display member 100 to overlap the second display area A2. For example, the third and fourth vibration apparatuses 230 and 240 can be disposed at or connected to the rear surface of the rear member 170 to overlap the second display area A2.

Each of the first to fourth vibration apparatuses 210 to 240 can include a piezoelectric material (or a piezoelectric device). The first to fourth vibration apparatuses 210 to 240 can configured in a piezoelectric ceramic material.

The supporting frame 300 can be disposed at the rear surface of the display member 100 and can cover the vibration apparatus 200. The support frame 300 can additionally support the display member 100.

The supporting frame 300 can include a metal material. For example, the supporting frame 300 can include a metal material such as stainless steel (SUS), stainless steel (SUS) including other metals such as nickel (Ni), iron (Fe), aluminum (Al)-based, or magnesium (Mg), but embodiments of the present disclosure are not limited thereto. The supporting frame 300 can dissipate heat, occurring based on driving of the display member 100, and/or heat occurring based on driving of the vibration apparatus 200. For example, the supporting frame 300 can be a middle frame or a middle plate, or the like, but embodiments of the present disclosure are not limited thereto.

The adhesive member 400 can be disposed or connected between the rear surface of the display member 100 (or the rear member 170) and the supporting frame 300. For example, the adhesive member 400 can be configured to connect or couple the supporting frame 300 to the rear surface of the display member 100 based on a partial attachment scheme (or a partial bonding method or a local bonding scheme) instead of a whole surface attachment scheme (or a whole surface bonding method or an entire surface attachment scheme). The adhesive member 400 can be connected between the supporting frame 300 and the rear surface of the display member 100 to be spaced apart from the vibration apparatus 200 and can be configured to surround around the vibration apparatus 200. For example, the adhesive member 400 can be connected between the supporting frame 300 and the rear member 170 of the display member 100 to be spaced apart from the vibration apparatus 200 and can be configured to surround around the vibration apparatus 200.

The adhesive member 400 can be implemented in a pattern shape between the rear surface of the display member 100 and the supporting frame 300. For example, the adhesive member 400 can be implemented in a tetragonal band shape or a circular band shape to overlap each of the first and second display areas A1 and A2 of the display panel 110 (e.g., similar to a type of gasket or O-ring, which can also help seal the vibration apparatus 200 and prevent moisture or dust penetration). For example, the adhesive member 400 can be implemented to overlap a periphery portion of each of the first and second display areas A1 and A2 of the display panel 110. The adhesive member 400 can provide a closed sound space between the rear surface of the display member 100 and the supporting frame 300. The adhesive member 400 can be separated at a region overlapping the third display area A3 of the display panel 110. For example, the adhesive member 400 can be configured to overlap each of the first display area A1 and the second display area A2, other than the third display area A3, of the display panel 110 (e.g., to facilitate bending and prevent damage to the vibration apparatus 200).

The adhesive member 400 can be implemented in a pattern shape between the rear surface of the display member 100 and the supporting frame 300. The adhesive member 400 can be partially disposed between the supporting frame 300 and the rear surface of the display member 100 based on the partial attachment scheme instead of the whole surface attachment scheme, and thus, can include a plurality of adhesive patterns or a hollow portion. Accordingly, the vibration apparatus 200 can be connected to the rear surface of the display member 100 between adhesive patterns of the adhesive member 400, or can be connected to the rear surface of the display member 100 at the hollow portion of the adhesive member 400. In addition, the vibration apparatus 200 can be spaced apart from the supporting frame 300. For example, the vibration apparatus 200 can be spaced apart from each of the supporting frame 300 and the adhesive member 400.

The adhesive member 400 according to an embodiment of the present disclosure can include a pressure sensitive adhesive (PSA), an optically clear adhesive (OCA), or an optically clear resin (OCR), epoxy resin, acrylic resin, silicone resin, urethane resin, a double-sided tape, or a double-sided foam pad, but embodiments of the present disclosure are not limited thereto.

The apparatus 10 according to an embodiment of the present disclosure can further include a set frame 500 and a back cover 600.

The set frame 500 can be disposed at a rear surface of the supporting frame 300 or under the supporting frame 300. The set frame 500 can include a space 520 which accommodates a peripheral circuit 510, such as a battery and various circuit elements for driving of the apparatus 10.

The back cover 600 can be disposed at a rear surface of the set frame 500 or under the set frame 500. The back cover 600 can be a rearmost surface of the apparatus 10. The back cover 600 can include a metal material, a plastic material, or a glass material, but embodiments of the present disclosure are not limited thereto.

The apparatus 10 according to an embodiment of the present disclosure can output a sound S, generated based on a vibration of the display member 100 by a vibration of the vibration apparatus 200 disposed or interposed between the display member 100 and the supporting frame 300, in a forward direction of the display member 100, and the vibration apparatus 200 can be surrounded by the adhesive member 400, thereby enhancing the reliability of the vibration apparatus 200 including a piezoelectric material (or a piezoelectric device).

Figure 4:
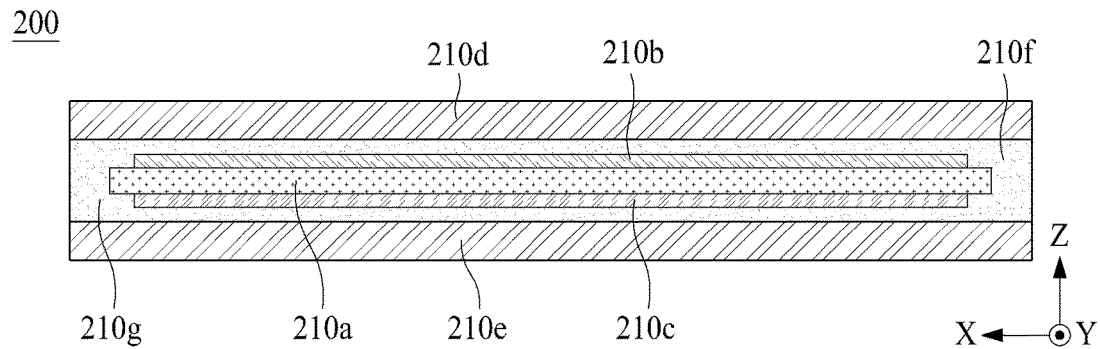
FIG. 4 illustrates a vibration apparatus according to an embodiment of the present disclosure.
Figure 5:
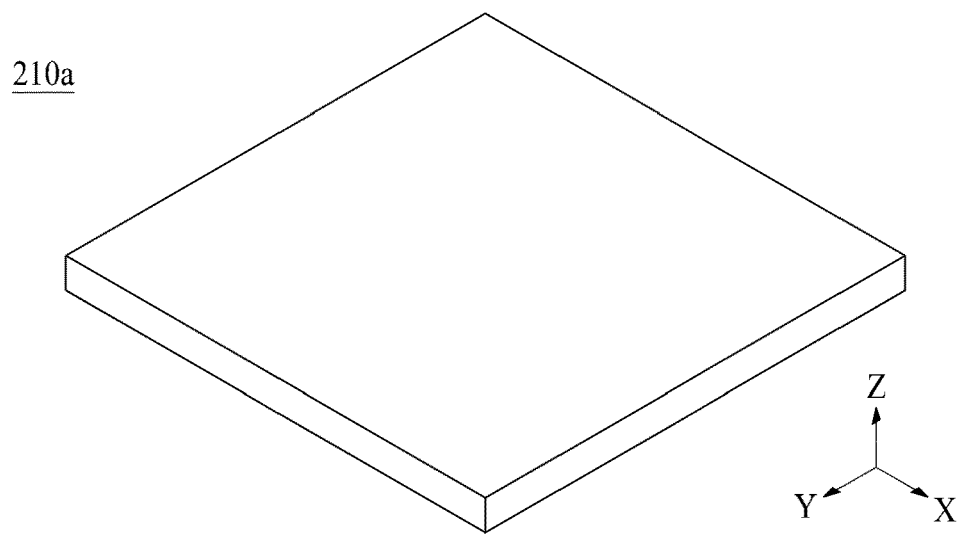
FIG. 5 illustrates a vibration portion illustrated in FIG. 4 according to an embodiment of the present disclosure.

FIG. 4 illustrates a vibration apparatus according to an embodiment of the present disclosure. FIG. 5 illustrates a vibration portion illustrated in FIG. 4.

With reference to FIGS. 4 and 5, the vibration apparatus 200 (or a plurality of vibration apparatuses 210, 220, 230 and 240) can include a vibration portion 210a, a first electrode portion 210b, and a second electrode portion 210c.

The vibration portion 210a according to an embodiment of the present disclosure can include a piezoelectric material. For example, the vibration portion 210a can include at least one or more of a piezoelectric inorganic material and a piezoelectric organic material.

The vibration portion 210a according to an embodiment of the present disclosure can include a piezoelectric material (or an electro active material) having a piezoelectric effect. For example, the piezoelectric material can have a characteristic where pressure or twisting is applied to a crystalline structure by an external force, a potential difference occurs due to dielectric polarization caused by a relative position change of a positive (+) ion and a negative (−) ion, and a vibration is generated by an electric field based on a voltage applied thereto. The vibration portion 210a can be referred to as the terms such as a vibration layer, a piezoelectric layer, a piezoelectric material layer, an electro active layer, a piezoelectric material portion, an electro active portion, a piezoelectric structure, a piezoelectric composite layer, or the like, but the terms are not limited thereto.

The vibration apparatus 200 or the vibration portion 210a according to an embodiment of the present disclosure can include a ceramic-based material for implementing a relatively high vibration, or can include a piezoelectric ceramic having a perovskite-based crystalline structure. The perovskite crystalline structure can have a piezoelectric effect and an inverse piezoelectric effect, and can be a plate-shaped structure having orientation.

According to an embodiment of the present disclosure, the vibration apparatus 200 or the vibration portion 210a can include a lead zirconate titanate (PZT)-based material including lead (Pb), zirconium (Zr), and titanium (Ti) or can include a lead zirconate nickel niobate (PZNN)-based material including lead (Pb), zirconium (Zr), nickel (Ni), and niobium (Nb), but embodiments of the present disclosure are not limited thereto. In another embodiment, the vibration apparatus 200 or the vibration portion 210a can include at least one of $CaTiO_3$, $BaTiO_3$, and $SrTiO_3$ without Pb, but embodiments of the present disclosure are not limited thereto.

The first electrode portion 210b can be disposed at a first surface (or an upper surface) of the vibration portion 210a and can be electrically connected to the first surface of the vibration portion 210a. The second electrode portion 210c can be disposed at a surface which differs from the first surface of the vibration portion 210a. For example, the second electrode portion 210c can be disposed at a second surface (or a lower surface) of the vibration portion 210a and can be electrically connected to the second surface of the vibration portion 210a. For example, the vibration portion 210a can be polarized (or poling) by a certain voltage applied to the first electrode portion 210b and the second electrode portion 210c in a certain temperature atmosphere or a temperature atmosphere which is changed from a high temperature to a room temperature, but embodiments of the present disclosure are not limited thereto.

The first electrode portion 210b can have a single electrode shape where the first electrode portion 210b is disposed on or across an entire first surface of the vibration portion 210a. The first electrode portion 210b according to an embodiment of the present disclosure can include a transparent conductive material, a semitransparent conductive material, or an opaque conductive material. For example, the transparent conductive material or the semitransparent conductive material can include indium tin oxide (ITO) or indium zinc oxide (IZO), but embodiments of the present disclosure are not limited thereto. The opaque conductive material can include aluminum (Al), copper (Cu), gold (Au), molybdenum (Mo), magnesium (Mg), or an alloy thereof, but embodiments of the present disclosure are not limited thereto.

The second electrode portion 210c can be disposed at the second surface (or a rear surface or backside surface), which is opposite to or different from the first surface, of the vibration portion 210a and can be electrically connected to the second surface of the vibration portion 210a. For example, the second electrode portion 210c can have a single electrode shape where the second electrode portion 210c is disposed on or across an entire second surface of the vibration portion 210a. The second electrode portion 210c according to an embodiment of the present disclosure can include a transparent conductive material, a semitransparent conductive material, or an opaque conductive material. For example, the second electrode portion 210c can include the same material as the first electrode portion 210b. As another embodiment of the present disclosure, the second electrode portion 210c can include a material which differs from the first electrode portion 210b.

The vibration apparatus 200 according to an embodiment of the present disclosure can further include a first cover member (or a first cover portion) 210d and a second cover member (or a second cover portion) 210e.

The first cover member 210d can be disposed at a first surface of the vibration portion 210a. For example, the first cover member 210d can be at the first electrode portion 210b. For example, the first cover member 210d can be over the first electrode portion 210b. For example, the first cover member 210d can cover the first electrode portion 210b disposed at the first surface of the vibration portion 210a, and thus, can protect the first surface of the vibration portion 210a or the first electrode portion 210b.

The second cover member 210e can be disposed at a second surface of the vibration portion 210a. For example, the second cover member 210e can be at the second electrode portion 210c. For example, the second cover member 210e can be under the second electrode portion 210c. For example, the second cover member 210e can cover the second electrode portion 210c disposed at the second surface of the vibration portion 210a, and thus, can protect the second surface of the vibration portion 210a or the second electrode portion 210c. In other words, the vibration portion 210a is disposed between the first cover member 210d and the second cover member 210e.

Each of the first cover member 210d and the second cover member 210e according to an embodiment of the present disclosure can include one or more materials of plastic, fiber, and wood, but embodiments of the present disclosure are not limited thereto. For example, each of the first cover member 210d and the second cover member 210e can include the same material or different materials. For example, each of the first cover member 210d and the second cover member 210e can be a polyimide (PI) film or a polyethylene terephthalate film (PET), but embodiments of the present disclosure are not limited thereto.

The vibration apparatus 200 according to an embodiment of the present disclosure can further include a first adhesive layer 210f and a second adhesive layer 210g. For example, the first adhesive layer 210f can be disposed between the first cover member 210d and the first electrode portion 210b. For example, the second adhesive layer 210g can be disposed between the second cover member 210e and the second electrode portion 210c.

The first cover member 210d according to an embodiment of the present disclosure can be at the first electrode portion 210b. For example, the first cover member 210d can be disposed at the first surface of the vibration portion 210a by the first adhesive layer 210f. For example, the first cover member 210d can be connected or coupled to the first electrode portion 210b by the first adhesive layer 210f. For example, the first cover member 210d can be disposed at the first surface of the vibration portion 210a by a film laminating process using the first adhesive layer 210f. Accordingly, the vibration portion 210a can be integrated (or disposed) into the first cover member 210d.

The second cover member 210e according to an embodiment of the present disclosure can be at the second electrode portion 210c. For example, the second cover member 210e can be disposed at the second surface of the vibration portion 210a by the second adhesive layer 210g. For example, the second cover member 210e can be connected or coupled to the second electrode portion 210c by the second adhesive layer 210g. For example, the second cover member 210e can be disposed at a second surface of the vibration portion 210a by a film laminating process using the second adhesive layer 210g. Accordingly, the vibration portion 210a can be integrated (or disposed) into the second cover member 210e.

According to an embodiment of the present disclosure, the first adhesive layer 210f and the second adhesive layer 210g can completely surround and envelop the vibration portion 210a. For example, the first adhesive layer 210f and the second adhesive layer 210g can be disposed between the first cover member 210d and the second cover member 210e to surround the vibration portion 210a, the first electrode portion 210b, and the second electrode portion 210c. For example, the first adhesive layer 210f and the second adhesive layer 210g can be disposed between the first cover member 210d and the second cover member 210e to completely surround the vibration portion 210a, the first electrode portion 210b, and the second electrode portion 210c. For example, the vibration portion 210a, the first electrode portion 210b, and the second electrode portion 210c can be buried or embedded between the first adhesive layer 210f and the second adhesive layer 210g. For convenience of description, the first adhesive layer 210f and the second adhesive layer 210g are illustrated, or are not limited thereto and can be provided as one adhesive layer.

Each of the first adhesive layer 210f and the second adhesive layer 210g according to an embodiment of the present disclosure can include an electrical insulation material which has adhesive properties and is capable of compression and decompression. For example, each of the first adhesive layer 210f and the second adhesive layer 210g can include epoxy resin, acrylic resin, silicone resin, or urethane resin, but embodiments of the present disclosure are not limited thereto.

According to an embodiment of the present disclosure, the vibration portion 210a can be configured as one body by the first and second cover members 210d and 210e, thereby providing the vibration apparatus 200 having a simplified structure and a thin thickness.

FIGS. 6A to 6E illustrate a vibration portion of a vibration apparatus according to embodiments of the present disclosure. FIGS. 6A to 6E illustrate modification embodiments of the vibration portion illustrated in FIGS. 4 and 5.

Figure 6A:
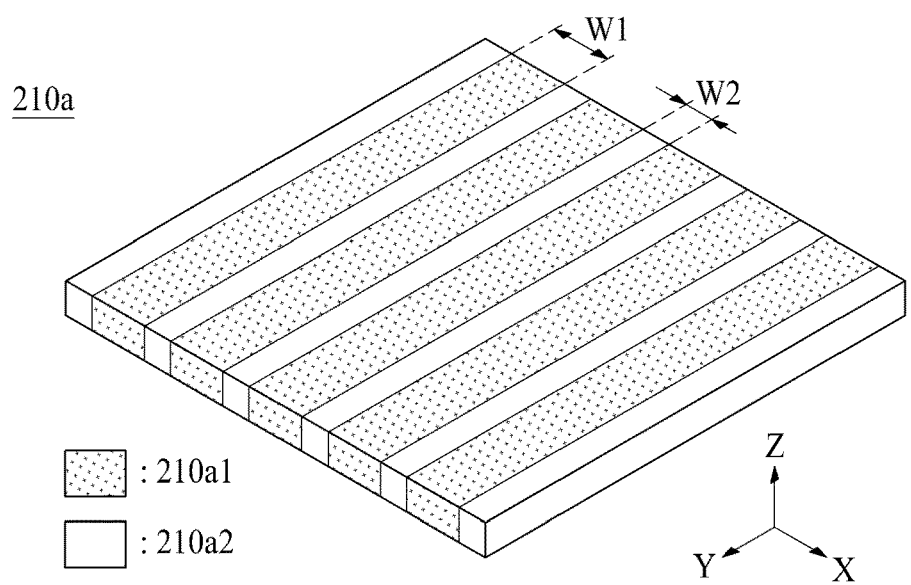
FIGS. 6A to 6E illustrate a vibration portion of a vibration apparatus according to embodiments of the present disclosure.
Figure 6B:
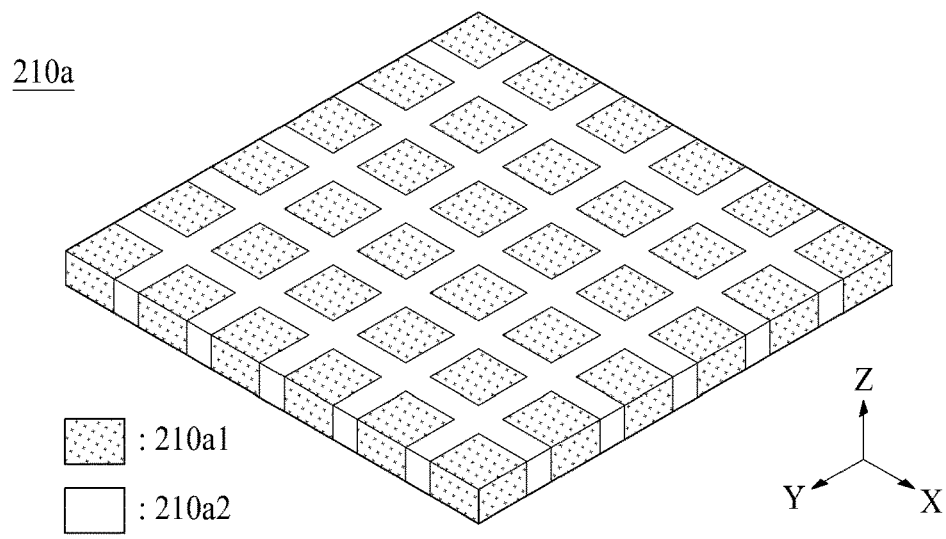
Figure 6C:
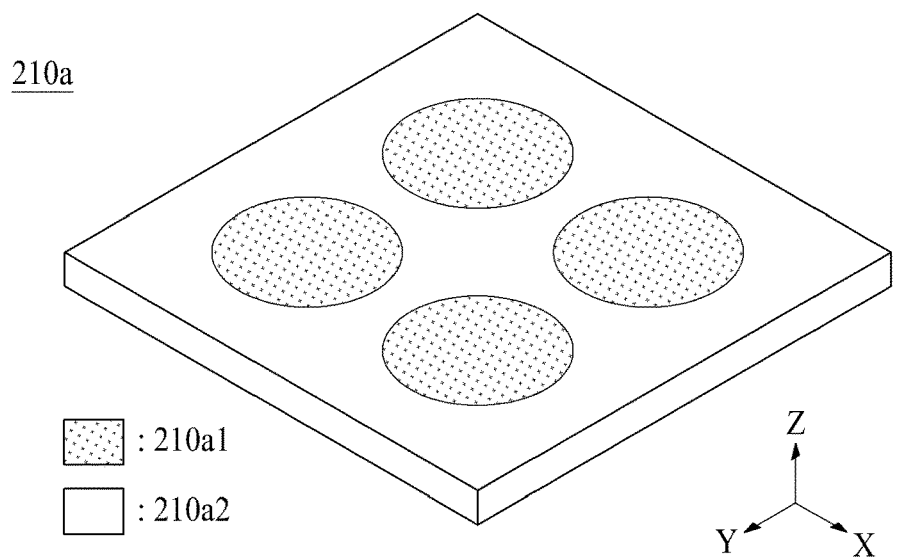
Figure 6D:
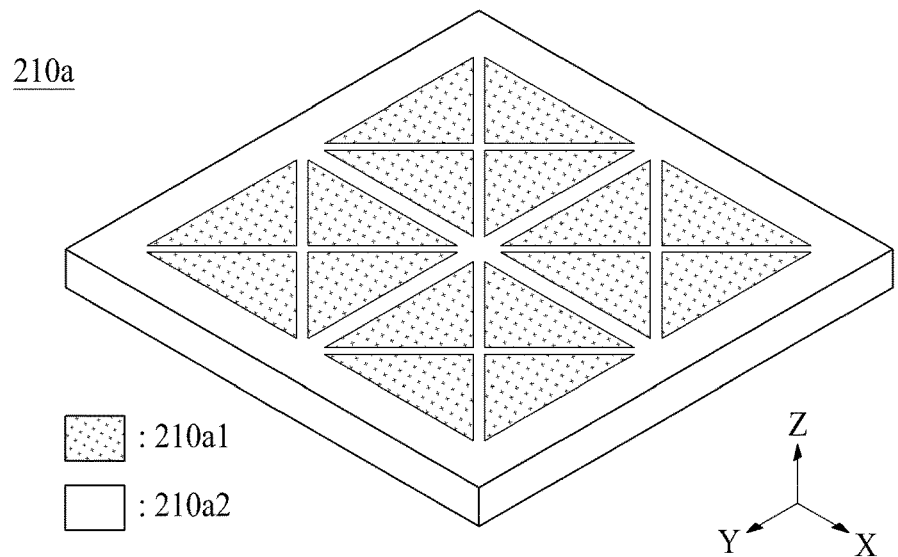
Figure 6E:
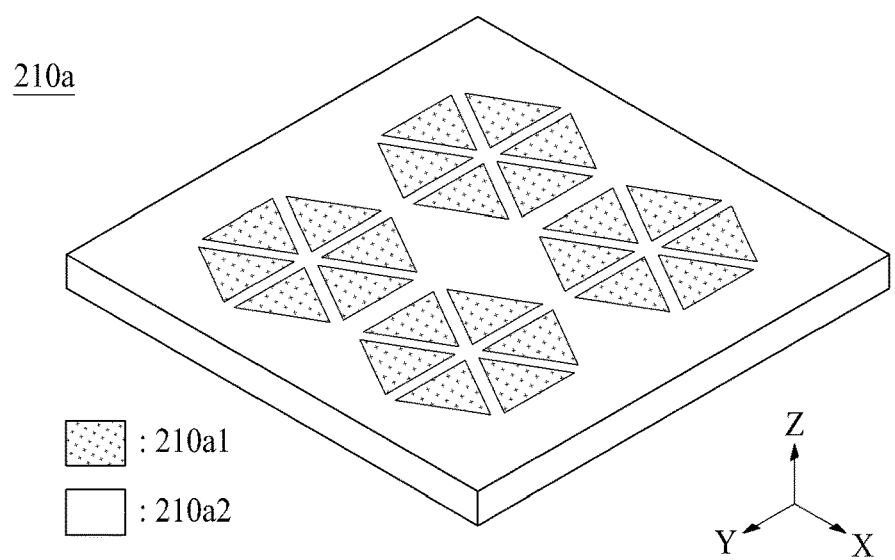

With reference to FIGS. 6A and 6E, a vibration portion 210a of a vibration apparatus 200 according to another embodiment of the present disclosure can include a first portion 210a1 and a second portion 210a2. The first electrode portion, the second electrode portion, the first cover member, the second cover member, the first adhesive layer, and the second adhesive layer described above with reference to FIG. 4 can be identically configured. The vibration apparatus 200 according to another embodiment of the present disclosure can be referred to as a flexible vibration structure, a flexible vibrator, a flexible vibration generating device, a flexible vibration generator, a flexible sounder, a flexible sound device, a flexible sound generating device, a flexible sound generator, a flexible actuator, a flexible speaker, a flexible piezoelectric speaker, a film actuator, a film type piezoelectric composite actuator, a film speaker, a film piezoelectric speaker, or a film type piezoelectric composite speaker, or the like, but embodiments of the present disclosure are not limited thereto.

The vibration portion 210a according to an embodiment of the present disclosure can include a plurality of first portions 210a1 and a plurality of second portions 210a2.

The vibration portion 210a can include the plurality of first portions 210a1 and the plurality of second portions 210a2 between the plurality of first portions 210a1. Each of the plurality of first portions 210a1 can include at least one or more of a piezoelectric inorganic material and a piezoelectric organic material.

For example, the first portion 210a1 can include an inorganic material, and the second portion 210a2 can include an organic material. For example, the first portion 210a1 can have a piezoelectric material, and the second portion 210a2 can have a ductile characteristic or flexibility. For example, the inorganic material of the first portion 210a1 can have a piezoelectric characteristic, and the organic material of the second portion 210a2 can have a ductile characteristic or flexibility. For example, the plurality of first portions 210a1 and the plurality of second portions 210a2 can be alternately and repeatedly arranged in a second direction Y. Each of the plurality of first portions 210a1 can be disposed between two adjacent second portions 210a2 of the plurality of second portions 210a2.

With reference to FIG. 6A, each of the plurality of first portions 210a1 can have a first width W1 parallel to the first direction X and can have a length parallel to the second direction Y. For example, each of the plurality of second portions 210a2 can have a second width W2 parallel to the first direction X and can have a length parallel to the second direction Y. The first width W1 can be the same as or different than the second width W2. For example, the first width W1 can be greater than the second width W2. For example, the first portion 210a1 and the second portion 210a2 can include a line shape or a stripe shape having the same size or different sizes. Accordingly, the vibration portion 210a illustrated in FIG. 6A can have a 2-2 composite structure, and thus, can have a resonance frequency of 20 kHz or less. But embodiments of the present disclosure are not limited thereto, the resonance frequency of the vibration portion 210a can vary based on at least one or more of a shape, a length, and a thickness of the vibration portion.

According to an embodiment of the present disclosure, the first portion 210a1 can be a piezoelectric portion, a piezoelectric element, an inorganic portion, an inorganic material portion, a piezoelectric layer, a vibration layer, a displacement layer, or a displacement element, or the like, but the terms are not limited thereto. For example, the second portion 210a2 can be a ductile portion, an elastic portion, a flexible portion, a stretchable portion, an organic portion, an organic material portion, a damping portion, a bending portion, or a bounce portion, or the like, but the terms are not limited thereto.

Each of the plurality of first portions 210a1 and the plurality of second portions 210a2 can be disposed (or arranged) in parallel on the same plane (or the same layer). Each of the plurality of second portions 210a2 can be configured to fill a gap between two adjacent first portions 210a1. Each of the plurality of second portions 210a2 can be connected to or attached on an adjacent first portion 210a1. Accordingly, the vibration portion 210a can be extended to a desired size or length based on lateral coupling (or lateral connection) of the first portion 210a1 and the second portion 210a2.

The width W2 of each of the plurality of second portions 210a2 can decrease progressively in a direction from a center portion of the vibration portion 210a or the vibration apparatus 200 to both edge portions (or both ends) thereof.

According to an embodiment of the present disclosure, when the vibration portion 210a or the vibration apparatus 200 vibrates in a vertical direction Z (or a thickness direction), a second portion 210a2 having a largest width W2 among the plurality of second portions 210a2 can be located at a portion on which a largest stress concentrates. When the vibration portion 210a or the vibration apparatus 200 vibrates in the vertical direction Z, a second portion 210a2 having a smallest width W2 among the plurality of second portions 210a2 can be located at a portion where a relatively smallest stress occurs. For example, the second portion 210a2 having the largest width W2 among the plurality of second portions 210a2 can be disposed at a center portion of the vibration portion 210a, and the second portion 210a2 having the smallest width W2 among the plurality of second portions 210a2 can be disposed at both periphery portions of the vibration portion 210a. Accordingly, when the vibration portion 210a or the vibration apparatus 200 vibrates in the vertical direction Z, an overlap of a resonance frequency or interference of a sound wave occurring at a portion on which a largest stress concentrates can be minimized, and thus, a dip in a sound pressure level occurring in a low-pitched sound band can be reduced. For example, the flatness of a sound characteristic can be a magnitude of a deviation between a highest sound pressure level and a lowest sound pressure level.

Each of the plurality of first portions 210a1 can have different sizes (or widths). For example, a size (or a width) of each of the plurality of first portions 210a1 can decrease or increase progressively in a direction from the center portion of the vibration portion 210a or the vibration apparatus 200 to both periphery portions (or both sides or both ends) thereof. For example, a sound pressure level characteristic of a sound of the vibration portion 210a can be enhanced by various unique vibration frequencies based on vibrations of the plurality of first portions 210a1 having different sizes, and a reproduction band of a sound can be extended and audio fidelity can be improved.

With reference to FIG. 6B, a vibration portion 210a according to another embodiment of the present disclosure can include a plurality of first portions 210a1 which are spaced apart from one another along the first direction X and the second direction Y and a second portion 210a2 disposed between the plurality of first portions 210a1. The plurality of first portions 210a1 can be disposed spaced apart from one another along each of the first direction X and the second direction Y. For example, the plurality of first portions 210a1 can have a hexahedral shape having the same size and can be arranged in a lattice shape or a grid arrangement. The second portion 210a2 can be disposed between the plurality of first portions 210a1 along each of the first direction X and the second direction Y. The second portion 210a2 can be configured to fill a gap between two adjacent first portions 210a1 or to surround each of the plurality of first portions 210a1. Therefore, the second portion 210a2 can be connected to or attached on an adjacent first portion 210a1. For example, a width of the second portion 210a2 disposed between two first portions 210a1 adjacent to each other along the first direction X can be the same as or different from the first portion 210a1, and a width of a second portion 210a2 disposed between two first portions 210a1 adjacent to each other along the second direction Y can be the same as or different from the first portion 210a1. Accordingly, the vibration portion 210a illustrated in FIG. 6B can have a resonance frequency of 30 MHz or less based on a 1-3 composite structure. However, embodiments of the present disclosure are not limited thereto, and the resonance frequency of the vibration portion 210a can vary based on one or more of a shape, a length, and a thickness of the vibration portion.

With reference to FIG. 6C, a vibration portion 210*a* according to another embodiment of the present disclosure can include a plurality of first portions 210*a*1 which are spaced apart from one another along the first direction X and the second direction Y and a second portion 210*a*2 which surrounds each of the plurality of first portions 210*a*1. Each of the plurality of first portions 210*a*1 can have a planar structure having a circular shape. For example, each of the plurality of first portions 210*a*1 can have a circular plate shape, but embodiments of the present disclosure are not limited thereto, and each of the plurality of first portions 210*a*1 can have a dot shape including an oval shape, a polygonal shape, or a donut shape. The second portion 210*a*2 can be configured to surround each of the plurality of first portions 210*a*1. Therefore, the second portion 210*a*2 can be connected to or attached on a lateral surface of each of the plurality of first portions 210*a*1. The plurality of first portions 210*a*1 and the second portion 210*a*2 can be disposed (or arranged) in parallel on the same plane (or the same layer). Accordingly, the vibration portion 210*a* illustrated in FIG. 6C can be implemented as a vibration source (or a vibration element) having a circular shape to have a 1-3 composite structure, and thus, can have a resonance frequency of 30 MHz or less, thereby enhancing a vibration characteristic or a sound output characteristic. However, embodiments of the present disclosure are not limited thereto, and the resonance frequency of the vibration portion 210*a* can vary based on one or more of a shape, a length, and a thickness of the vibration portion.

With reference to FIG. 6D, a vibration portion 210*a* according to another embodiment of the present disclosure can include a plurality of first portions 210*a*1 which are spaced apart from one another along the first direction X and the second direction Y and a second portion 210*a*2 which surrounds each of the plurality of first portions 210*a*1. Each of the plurality of first portions 210*a*1 can have a planar structure having a triangular shape. For example, each of the plurality of first portions 210*a*1 can have a triangular plate shape.

According to an embodiment of the present disclosure, four adjacent first portions 210*a*1 of the plurality of first portions 210*a*1 can be disposed adjacent to one another to form a tetragonal shape (or a square shape). A vertex of each of four adjacent first portions 210*a*1 forming a tetragonal shape can be disposed adjacent to a middle portion (or a center portion) of a tetragonal shape. The second portion 210*a*2 can be configured to surround each of the plurality of first portions 210*a*1. Therefore, the second portion 210*a*2 can be connected to or attached on a lateral surface of each of the plurality of first portions 210*a*1. The plurality of first portions 210*a*1 and the second portion 210*a*2 can be disposed (or arranged) in parallel on the same plane (or the same layer). Accordingly, the vibration portion 210*a* illustrated in FIG. 6D can have a 1-3 composite structure, and thus, can have a resonance frequency of 30 MHz or less, thereby enhancing a vibration characteristic or a sound output characteristic. However, embodiments of the present disclosure are not limited thereto, and the resonance frequency of the vibration portion 210*a* can vary based on one or more of a shape, a length, and a thickness of the vibration portion.

According to another embodiment of the present disclosure, as illustrated in FIG. 6E, six adjacent first portions 210*a*1 of the plurality of first portions 210*a*1 can be disposed adjacent to one another to form a hexagonal shape (or a regular hexagon). A vertex of each of six adjacent first portions 210*a*1 forming a hexagonal shape can be disposed adjacent to a middle portion (or a center portion) of a hexagonal shape. The second portion 210*a*2 can be configured to surround each of the plurality of first portions 210*a*1. Therefore, the second portion 210*a*2 can be connected to or attached on a lateral surface of each of the plurality of first portions 210*a*1. The plurality of first portions 210*a*1 and the second portion 210*a*2 can be disposed (or arranged) in parallel on the same plane (or the same layer). Accordingly, the vibration portion 210*a* illustrated in FIG. 6E can be implemented as a vibration source (or a vibration element) having a circular shape to have a 1-3 composite structure, and thus, can have a resonance frequency of 30 MHz or less, thereby enhancing a vibration characteristic or a sound output characteristic. However, embodiments of the present disclosure are not limited thereto, and the resonance frequency of the vibration portion 210*a* can vary based on one or more of a shape, a length, and a thickness of the vibration portion.

With reference to FIGS. 6D and 6E, 2N (where N is a natural number greater than or equal to 2) adjacent first portions 210*a*1 of a plurality of first portions 210*a*1 having a triangular shape can be arranged adjacent to one another to form a 2N-angular shape.

In FIGS. 6A to 6E, each of the plurality of first portions 210*a*1 according to an embodiment of the present disclosure can include an inorganic material portion. The inorganic material portion can include a piezoelectric material or an electro active material. The piezoelectric material or the electro active material can have a characteristic where pressure or twisting is applied to a crystalline structure by an external force, a potential difference occurs due to dielectric polarization caused by a relative position change of a positive (+) ion and a negative (−) ion, and a vibration is generated by an electric field based on a voltage applied thereto. With reference to FIG. 4, a first surface of each of the plurality of first portions 210*a*1 can be electrically connected to the first electrode portion 210*b*, and a second surface of each of the plurality of first portions 210*a*1 can be electrically connected to the second electrode portion 210*c*.

Figure 7:
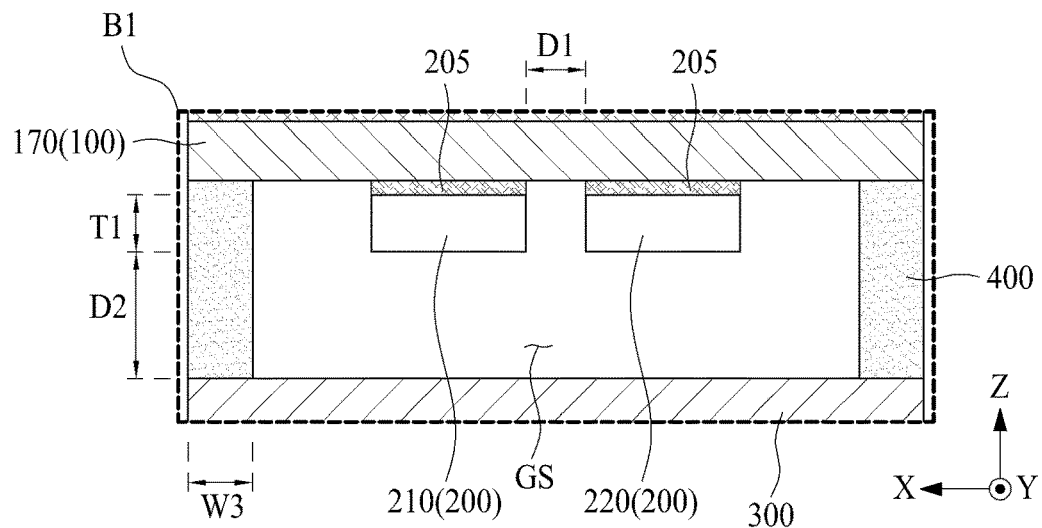
FIG. 7 is an enlarged view of a region 'B1' illustrated in FIG. 2 according to an embodiment of the present disclosure.
Figure 8:
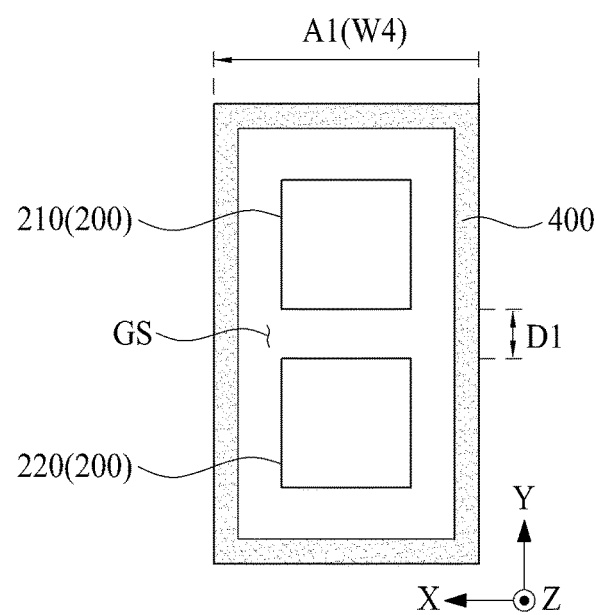
FIG. 8 is a plan view for describing an adhesive member and a vibration apparatus disposed at the first display area of the display member illustrated in FIG. 1 according to an embodiment of the present disclosure.

FIG. 7 is an enlarged view of a region '131' illustrated in FIG. 2. FIG. 8 is a plan view for describing an adhesive member and a vibration apparatus disposed at the first display area of the display member illustrated in FIG. 1. FIGS. 7 and 8 are diagrams for describing an arrangement structure of a vibration apparatus according to an embodiment of the present disclosure.

With reference to FIGS. 1, 7, and 8, a vibration apparatus 200 according to an embodiment of the present disclosure can include first and second vibration apparatuses 210 and 220 disposed at a first display area A1 of a display member 100, and third and fourth vibration apparatuses 230 and 240 disposed at a second display area A2 of the display member 100.

The first and second vibration apparatuses 210 and 220 can be disposed at a gap space GS provided between the display member 100 and the supporting frame 300, in the first display area A1 of the display member 100, and can be connected to a rear surface of the display member 100. Each of the first and second vibration apparatuses 210 and 220 can be connected to the rear surface of the display member 100 by a connection member 205. Each of the third and fourth vibration apparatuses 230 and 240 can be disposed at a gap space GS provided between the display member 100 and the supporting frame 300, in the second display area A2 of the display member 100, and can be connected to a rear surface of the display member 100. Each of the third and fourth vibration apparatuses 230 and 240 can be connected to the rear surface of the display member 100 by a connection member 205.

The connection member 205 can include an acrylic-based or urethane-based adhesive member, but embodiments of the present disclosure are not limited thereto. For example, the connection member 205 can include an acrylic-based adhesive member having a characteristic where an adhesive force is relatively good and hardness is high, so that a vibration of the vibration apparatuses 210 to 240 is well transferred to the display member 100. For example, the connection member 205 can include a double-sided foam adhesive pad including an acrylic-based adhesive layer or an acrylic-based adhesive resin curing layer.

The first and second vibration apparatuses 210 and 220 can be arranged in parallel along the first direction X to have a first interval D1 in the gap space GS. The third and fourth vibration apparatuses 230 and 240 can be arranged in parallel along the first direction X to have the first interval D1 in the gap space GS. For example, the first interval D1 can be 35% to 40% of a size of each of the vibration apparatuses 210 to 240. For example, the first interval D1 can be 35% to 40% of a size of a long-axis (or long-side) length of each of the vibration apparatuses 210 to 240. For example, when each of a widthwise length and a lengthwise length of the vibration apparatuses 210 to 240 is 6 cm, the first interval D1 can be 2.3 cm.

A total area of the first and second vibration apparatuses 210 and 220 obtained by summating areas of the first and second vibration apparatuses 210 and 220 can be 25% to 31% of a size of the display member 100 corresponding to the first display area A1. A total area of the first and second vibration apparatuses 210 and 220 obtained by summating areas of the first and second vibration apparatuses 210 and 220 can be 25% to 31% of half of a size of the display panel 110. A total area of the third and fourth vibration apparatuses 230 and 240 obtained by summating areas of the third and fourth vibration apparatuses 230 and 240 can be 25% to 31% of a size of the display member 100 corresponding to the second display area A2. A total area of the third and fourth vibration apparatuses 230 and 240 obtained by summating areas of the third and fourth vibration apparatuses 230 and 240 can be 25% to 31% of half of a size of the display member 100. For example, when a total area occupied by the first and second vibration apparatuses 210 and 220 is less than 25% of an area of the display member 100 corresponding to the first display area A1, a sound pressure level can decrease due to a reduction in size of each of the first and second vibration apparatuses 210 and 220. When the total area occupied by the first and second vibration apparatuses 210 and 220 is greater than 31% of the area of the display member 100 corresponding to the first display area A1, a sound pressure level can decrease due to a reduction in volume of the gap space GS, and due to an excessive size of a vibration apparatus 210 and 220 compared to the gap space GS, destructive interference between vibrations generated by the first and second vibration apparatuses 210 and 220 can increase, causing a reduction in sound pressure level. Thus, in order to provide an optimal balance between large vibration apparatuses and a large gape space GS (e.g., acting as a type of resonance chamber, resonance space, or a sound space, etc.) to produce the best sound, a cumulative size of the first and second vibration apparatuses 210 and 220 can be set to 25% to 31% (e.g., 28%) of half of a size of the display panel 110.

A distance D2 between each of the first to fourth vibration apparatuses 210 to 240 and the supporting frame 300 can be 0.5 to 3 times a thickness T1 of the first to fourth vibration apparatuses 210 to 240. For example, when the distance D2 between each of the first to fourth vibration apparatuses 210 to 240 and the supporting frame 300 is less than 0.5 times the thickness T1 of the first to fourth vibration apparatuses 210 to 240, a sound pressure level can decrease due to a reduction in size of each of the first and second vibration apparatuses. For example, when the distance D2 between each of the first to fourth vibration apparatuses 210 to 240 and the supporting frame 300 is greater than or equal to 3 times the thickness T1 of the first to fourth vibration apparatuses 210 to 240, a physical contact between the first and second vibration apparatuses and the supporting frame 300 can occur and a thickness of the apparatus 10 can increase.

In the adhesive member 400 corresponding to the first display area A1, a width W3 of the adhesive member 400 can be 10% to 30% (e.g., 20%) of a width W4 of the first display area A1 parallel to the first direction X. For example, when the width W3 of the adhesive member 400 is less than 10% of the width W4 of the first display area A1, an adhesive force between the adhesive member 400 and the rear surface of the display member 100 can decrease, causing a reduction in reliability. When the width W3 of the adhesive member 400 is greater than 10% of the width W4 of the first display area A1, a volume of the gap space GS can decrease, causing a reduction in sound pressure level. Thus, an optimal balance between adhesive force and reliability can be obtained when a width W3 of the adhesive member 400 can be 10% to 30% (e.g., 20%) of a width W4 of the first display area A1 parallel to the first direction X.

In the adhesive member 400 corresponding to the second display area A2, a width W3 of the adhesive member 400 can be 10% to 30% (e.g., 20%) of a width W4 of the second display area A2 parallel to the first direction X. For example, when the width W3 of the adhesive member 400 is less than 10% of the width W4 of the second display area A2, an adhesive force between the adhesive member 400 and the rear surface of the display member 100 can decrease, causing a reduction in reliability. When the width W3 of the adhesive member 400 is greater than 10% of the width W4 of the second display area A2, a volume of the gap space GS can decrease, causing a reduction in sound pressure level.

Figure 9:
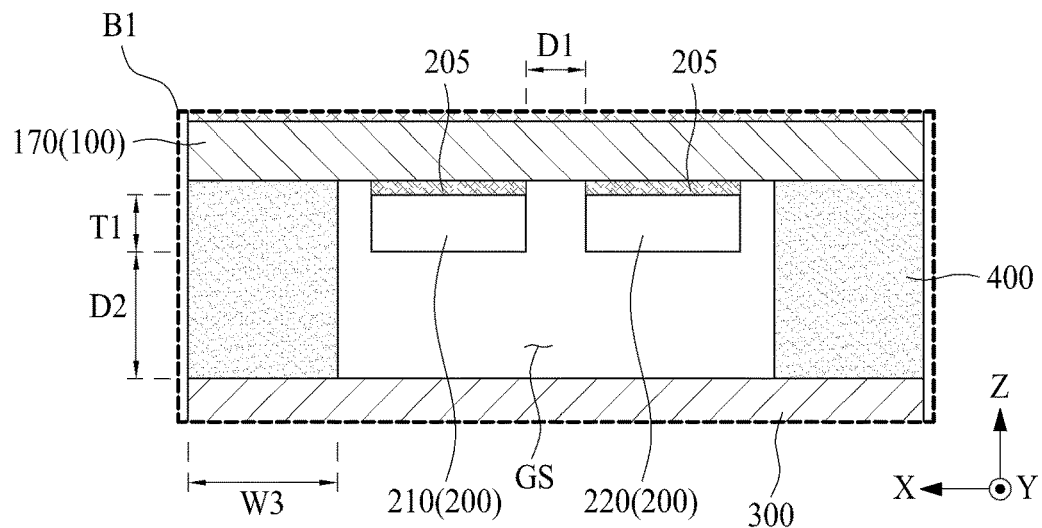
FIG. 9 is another enlarged view of a region 'B1' illustrated in FIG. 2 according to an embodiment of the present disclosure.
Figure 10:
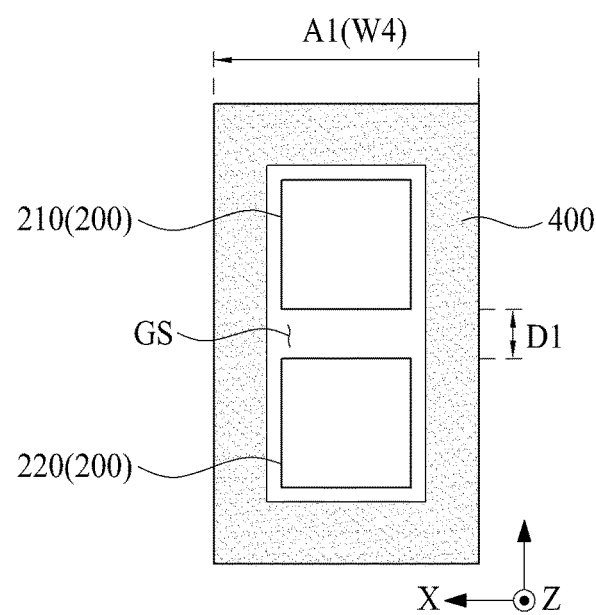
FIG. 10 is a plan view for describing an adhesive member and a vibration apparatus disposed at the first display area of the display member illustrated in FIG. 8 according to an embodiment of the present disclosure.

FIG. 9 is another enlarged view of a region 'B1' illustrated in FIG. 2. FIG. 10 is a plan view for describing an adhesive member and a vibration apparatus disposed in the first display area of the display member illustrated in FIG. 8. FIGS. 9 and 10 illustrate an embodiment implemented by modifying the adhesive member illustrated in FIGS. 7 and 8, and thus, in describing FIGS. 9 and 10, only an adhesive member will be described below.

With reference to FIGS. 9 and 10, in an apparatus according to another embodiment of the present disclosure, a width W3 of an adhesive member 400 can be about 30% of a width W4 of a first display area A1 parallel to a first direction X. Accordingly, an adhesive force between the adhesive member 400 and a rear surface of a display member 100 can be sufficiently secured based on the width W3 of the adhesive member 400.

Figure 11:
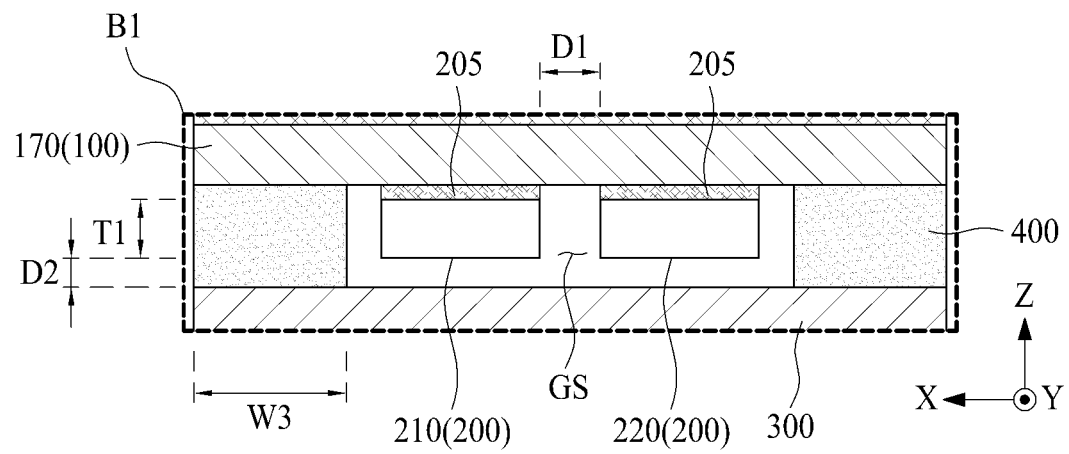
FIG. 11 is another enlarged view of the region 'B1' illustrated in FIG. 2 according to an embodiment of the present disclosure.

FIG. 11 is another enlarged view of the region 'B1' illustrated in FIG. 2. FIG. 11 illustrates an embodiment implemented by modifying a thickness of the adhesive member in an embodiment illustrated in FIGS. 9 and 10, and thus, in describing FIG. 11, only an adhesive member will be described below.

With reference to FIG. 11, in an apparatus according to another embodiment of the present disclosure, a thickness (or height) of an adhesive member 400 can be set so that a distance D2 between vibration apparatuses 210 to 240 and a supporting frame 300 is approximately 0.5 times a thickness T1 of the vibration apparatuses 210 to 240, and thus, a display member can vibrate based on a vibration of each of the vibration apparatuses 210 to 240 to output a sound, whereby an apparatus can be slimmed.

Figure 12:
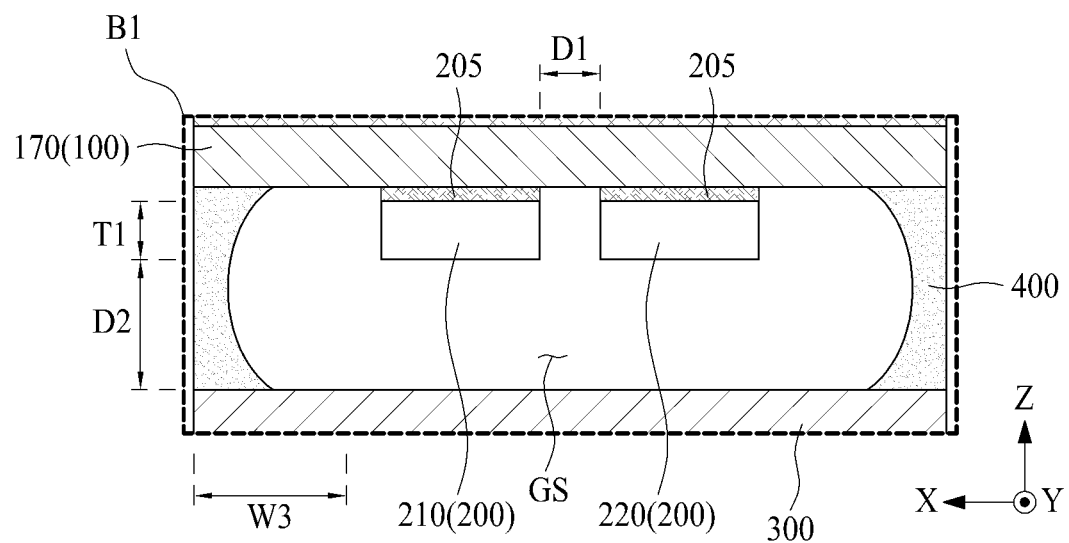
FIG. 12 is another enlarged view of the region 'B1' illustrated in FIG. 2 according to an embodiment of the present disclosure.
Figure 13:
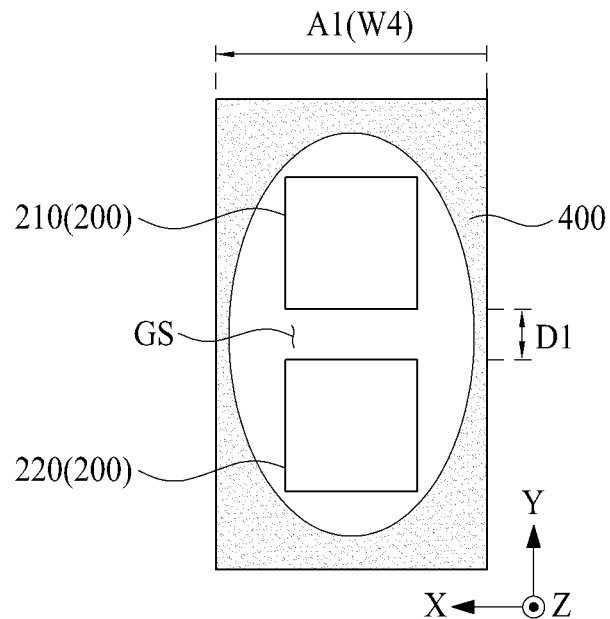
FIG. 13 is a plan view of the adhesive member illustrated in FIG. 12 according to an embodiment of the present disclosure.

FIG. 12 is another enlarged view of the region 'B1' illustrated in FIG. 2. FIG. 13 is a plan view of the adhesive member illustrated in FIG. 12. FIGS. 12 and 13 illustrate an embodiment implemented by modifying a shape of the adhesive member in an embodiment illustrated in FIGS. 9 and 10, and thus, in describing FIGS. 12 and 13, only an adhesive member will be described below.

With reference to FIGS. 12 and 13, in an apparatus according to another embodiment of the present disclosure, an adhesive member 400 can one-dimensionally include an oval shape (or a circular shape). Therefore, a gap space GS surrounded by the adhesive member 400 can one-dimensionally include an oval shape (or a circular shape). In addition, a lateral surface (or an inner surface) of the adhesive member 400 which is between a rear surface of a display member 100 and a supporting frame 300 or surrounds the gap space GS can include a curved shape or a concave curved shape. For example, in this way, a spherical or rounded type of resonance chamber, resonance space, or a sound space, etc. can be provided, which can improve sound quality while maintaining the structural integrity of the apparatus.

Therefore, according to another embodiment of the present disclosure, as reflection of a sound wave increases in the gap space GS due to an oval shape of the gap space GS, a sound pressure level can be enhanced. For example, a sound wave generated based on a vibration of each of vibration apparatuses 210 to 240 can be reflected from a concave lateral surface of the adhesive member 400 and can travel toward the display member 100, and thus, the efficiency of a vibration transferred to the display member 100 can increase, thereby enhancing a sound pressure level.

Figure 14:
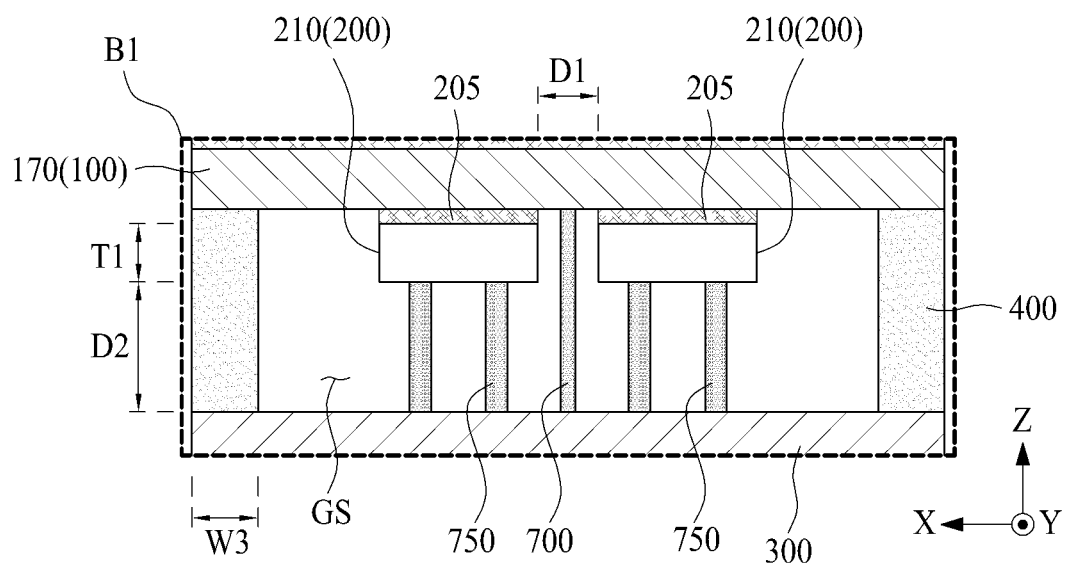
FIG. 14 is another enlarged view of the region 'B1' illustrated in FIG. 2 according to an embodiment of the present disclosure.
Figure 15:
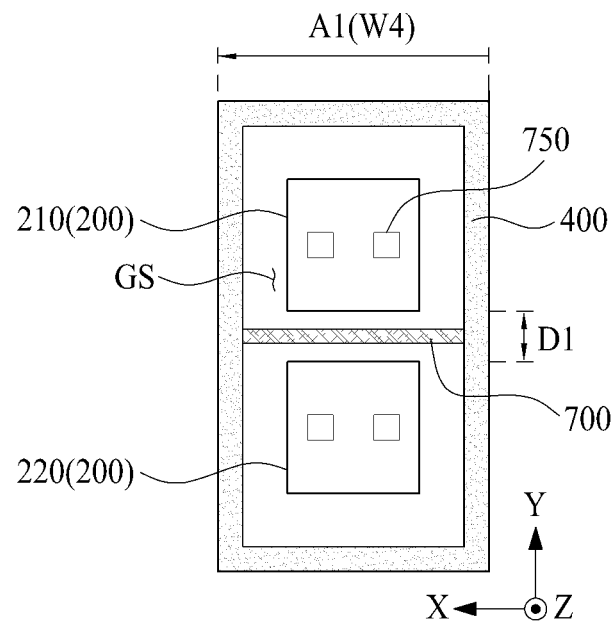
FIG. 15 is a plan view of FIG. 14 according to an embodiment of the present disclosure.

FIG. 14 is another enlarged view of the region 'B1' illustrated in FIG. 2. FIG. 15 is a plan view of FIG. 14. FIGS. 14 and 15 illustrate an embodiment where a partition is additionally provided in an embodiment illustrated in FIGS. 7 and 8, and thus, in describing FIGS. 14 and 15, only an element added to an embodiment illustrated in FIGS. 7 and 8 will be described below.

With reference to FIGS. 1, 14, and 15, an apparatus according to another embodiment of the present disclosure can further include a partition 700 which divides a gap space GS.

The partition 700 can be disposed between a first vibration apparatus 210 and a second vibration apparatus 220 in the gap space GS overlapping a first display area A1 and can be connected to a rear surface of the display member 100 and a supporting frame 300. Accordingly, the partition 700 can divide a space between the first vibration apparatus 210 and the second vibration apparatus 220, thereby minimizing sound interference between the first vibration apparatus 210 and the second vibration apparatus 220 (e.g., which can improve binaural sound or stereo sound).

The apparatus according to another embodiment of the present disclosure can further include one or more pad members 750 disposed between the vibration apparatuses 210 to 240 and a supporting frame 300.

The one or more pad members 750 can be connected between a rear surface of each of the vibration apparatuses 210 to 240 and the supporting frame 300. The one or more pad members 750 can include a material for adsorbing a vibration or adjusting a vibration. For example, the pad member 750 can include a material which differs from the partition 700, but embodiments of the present disclosure are not limited thereto. For example, the pad member 750 can include one of a silicone-based polymer, paraffin wax, and an acrylic-based polymer, but embodiments of the present disclosure are not limited thereto. For example, the pad member 750 can include a urethane-based material (or substance) having a relatively ductile characteristic compared to acrylic of acrylic and urethane, to minimize the transfer of a vibration of each of the vibration apparatuses 210 to 240 to the supporting frame 300.

The one or more pad members 750 can improve a reduction in sound pressure level in a specific frequency occurring in the vibration apparatuses 210 to 240 (e.g., which can improve sound at lower frequencies, such as bass sounds). For example, the one or more pad members 750 can be a resonance control pad, an external resonance pad, a gap pad, or a resonance controller, but embodiments of the present disclosure are not limited thereto.

Figure 16:
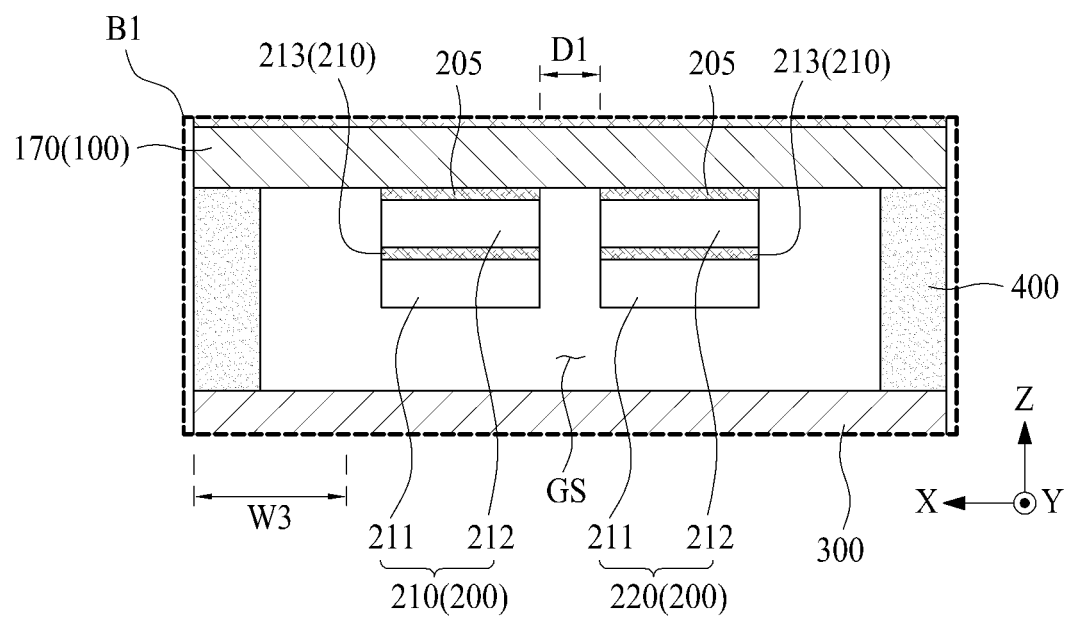
FIG. 16 is another enlarged view of the region 'B1' illustrated in FIG. 2 according to an embodiment of the present disclosure.

FIG. 16 is another enlarged view of the region 'B1' illustrated in FIG. 2. FIG. 16 illustrates an embodiment where a vibration apparatus is provided in an embodiment illustrated in FIGS. 7 and 8, and thus, in describing FIG. 16, only a vibration apparatus will be described below.

With reference to FIGS. 1 and 16, in an apparatus according to another embodiment of the present disclosure, a vibration apparatus 200 or each of first to fourth vibration apparatuses 210 to 240 can include a plurality of active vibration members 211 and 212 and a coupling member 213 between the plurality of active vibration members 211 and 212. For example, the vibration apparatus 200 or each of the first to fourth vibration apparatuses 210 to 240 can include a bimorph structure.

Each of the plurality of active vibration members 211 and 212 can be substantially the same as the vibration apparatus 200 described above with reference to FIGS. 4 to 6E, and thus, their repetitive descriptions can be omitted.

Each of the plurality of active vibration members 211 and 212 can be configured to displace (or vibrate or drive) in the same direction. For example, each of the plurality of active vibration members 211 and 212 can be stacked on each other to have the bimorph structure.

Each of the first to fourth vibration apparatuses 210 to 240 can include the plurality of active vibration members 211 and 212 which are configured to displace (or vibrate or drive) in the same direction, and thus, a displacement width (or a vibration width) can increase in the same voltage, whereby a sound pressure level can considerably increase without having to increase the voltage, which can reduce power consumption. Accordingly, a sound characteristic and/or a sound pressure level characteristic of a low-pitched sound band generated based on a vibration of the display member 100 based on each of the first to fourth vibration apparatuses 210 to 240 can be enhanced.

Figure 17:
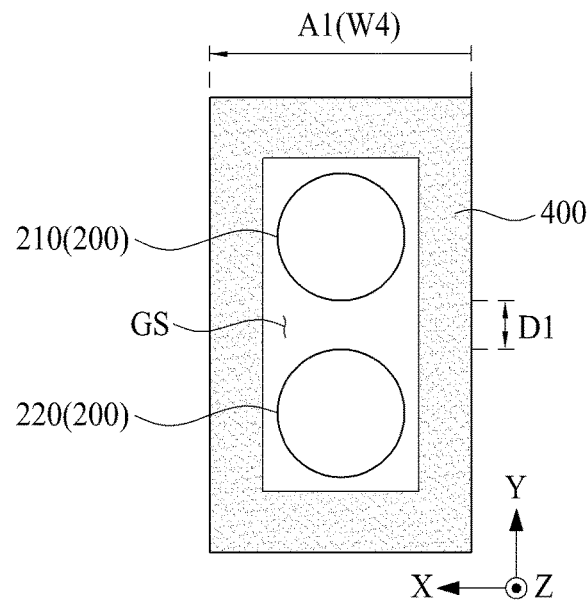
FIG. 17 is a plan view illustrating an adhesive member and a vibration apparatus disposed at a first display area of a display member in an apparatus according to another embodiment of the present disclosure.

FIG. 17 is a plan view illustrating an adhesive member and a vibration apparatus disposed in a first display area of a display member in an apparatus according to another embodiment of the present disclosure.

With reference to FIG. 17, in an apparatus according to another embodiment of the present disclosure, a vibration apparatus 200 or each of first to fourth vibration apparatuses 210 to 240 can be implemented to have a circular shape or a circular plate structure. For example, each of first to fourth vibration apparatuses 210 to 240 can be implemented as a vibration source (or a vibration element) having a circular shape, and thus, can output a uniform sound wave to an all-direction region, thereby more enhancing a sound pressure level (e.g., providing a more uniform sound).

The vibration apparatuses 210 to 240 having a circular shape illustrated in FIG. 17 can be identically applied to the vibration apparatuses 210 to 240 illustrated in FIGS. 7 to 16, and even in this situation, can output a uniform sound wave to an all-direction region, thereby further enhancing a sound pressure level characteristic.

Figure 18:
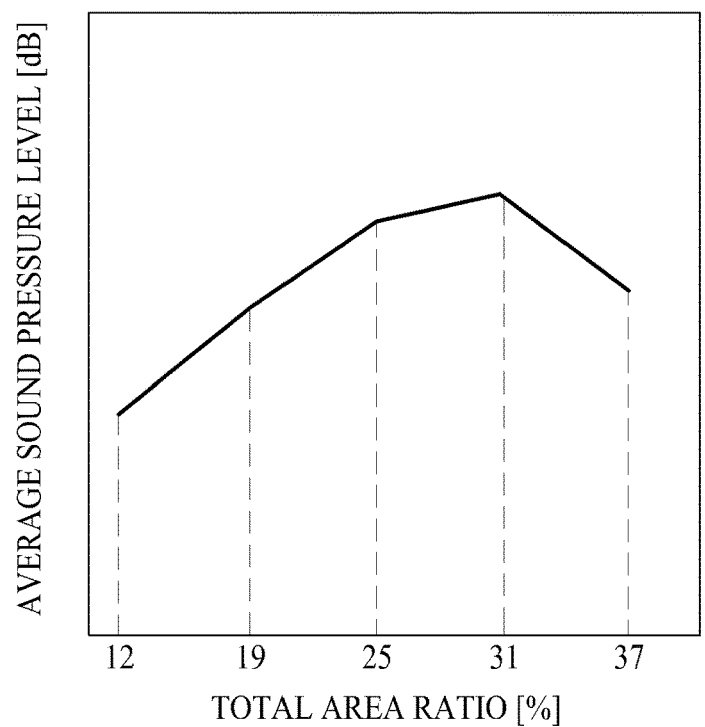
FIG. 18 illustrates an average sound pressure level characteristic with respect to a total area ratio of a size of a vibration apparatus to a size of a display member, in an apparatus according to an embodiment of the present disclosure.

FIG. 18 is a diagram showing an average sound pressure level characteristic with respect to a total area ratio of a size of a vibration apparatus to a size of a display member, in an apparatus according to an embodiment of the present disclosure. In an experiment of FIG. 18, an average sound pressure level characteristic with respect to a total area ratio of a vibration apparatus disposed at a region corresponding to a first display area of a display member is shown.

As seen in FIG. 18, the average sound pressure level is relatively higher in a situation where a total area ratio obtained by summating areas of first and second vibration apparatuses 210 and 220 is 25% to 31% (e.g., 28%) of a size of a display member 100 corresponding to a first display area A1, than a situation where the total area ratio is less than 25% or higher than 31% of a size of the display member 100 corresponding to the first display area A1.

Figure 19A:
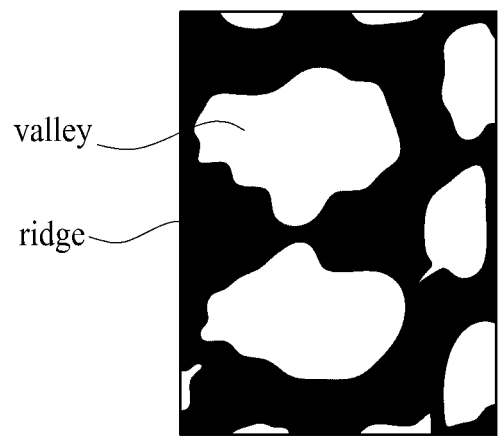
FIGS. 19A to 19D illustrate a vibration shape of an apparatus according to an embodiment of the present disclosure and vibration shapes of experiments 1 to 3.
Figure 19B:
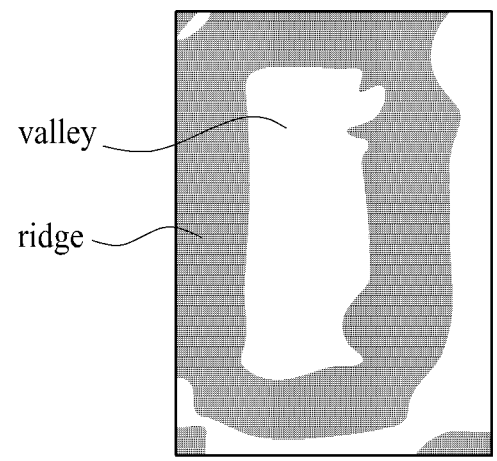
Figure 19C:
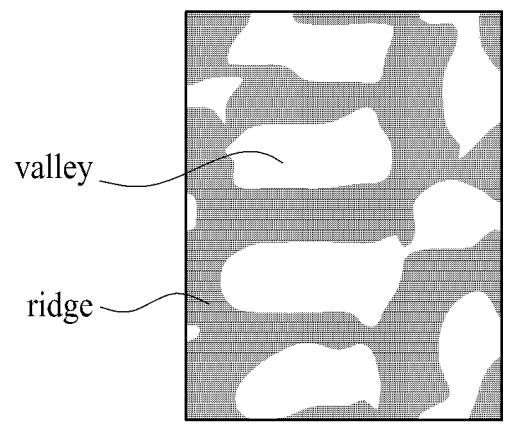
Figure 19D:
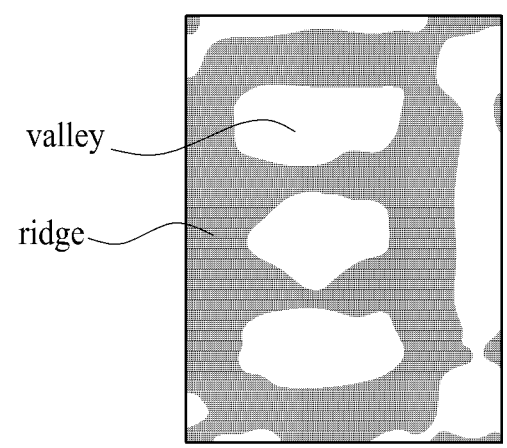

FIGS. 19A to 19D illustrate a vibration shape of an apparatus according to embodiments of the present disclosure and vibration shapes of experiments 1 to 3. FIG. 19A illustrates a vibration shape when two vibration apparatuses having a 6 cm×6 cm size are arranged at an interval of 2.3 cm as illustrated in FIG. 7. FIG. 19B illustrates a vibration shape when one vibration apparatus having a 6 cm×12 cm size is provided. FIG. 19C illustrates a vibration shape when two vibration apparatuses having a 6 cm×6 cm size are arranged at an interval of 4.6 cm. FIG. 19D illustrates a vibration shape when two vibration apparatuses having a 6 cm×6 cm size are arranged at an interval of 0.5 cm.

In a vibration shape of FIG. 19B or 19D, although a vibration source is separated, it can be seen that a size of each vibration source is small and there are a number of vibration sources, and thus, a partial division vibration increases. Although the occurrence of destructive interference increases and a vibration source is separated, an effect of improving a sound pressure level characteristic can be slight.

According to an embodiment of the present disclosure, comparing with vibration shapes illustrated in FIGS. 19B, 19C, and 19D, in a vibration shape illustrated in FIG. 19A, it can be seen that a vibration source having a large circular shape occurs and a vibration is vertically symmetrically separated, and thus, vibration uniformity is high. Accordingly, a sound pressure level characteristic of a sound of a low-pitched sound band can be enhanced (e.g., bass can be improved).

A vibration apparatus according to an embodiment of the present disclosure can be applied to a vibration apparatus disposed at an apparatus. The apparatus according to an embodiment of the present disclosure can be applied to mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, and home appliances, or the like. In addition, the vibration apparatus according to some embodiments of the present disclosure can be applied to organic light-emitting lighting apparatuses or inorganic light-emitting lighting apparatuses. When the vibration apparatus according to an embodiment of the present disclosure is applied to lighting apparatuses, the vibration apparatus can act as lighting and a speaker. In addition, when the vibration apparatus according to some embodiments of the present disclosure is applied to a mobile device, or the like, the vibration apparatus can be one or more of a speaker, a receiver, and a haptic device, but embodiments of the present disclosure are not limited thereto.

An apparatus according to an embodiment of the present disclosure will be described below.

An apparatus according to some embodiments of the present disclosure can comprise a display member configured to display an image, a vibration apparatus at a rear surface of the display member, a supporting frame at a rear surface of the vibration apparatus, and an adhesive member between the supporting frame and the rear surface of the display member, the adhesive member and/or the adhesive member being spaced apart from the vibration apparatus, the vibration apparatus may be configured to vibrate in a direction toward the display member.

According to some embodiments of the present disclosure, the vibration apparatus can be configured to vibrate the display member to output one or more of a sound and a haptic feedback. The vibration apparatus may be disposed in contact with or mounted on the rear surface of the display member. The vibration apparatus may be spaced apart from, but facing the supporting frame, i.e. a front surface of the supporting frame.

According to some embodiments of the present disclosure, the rear surface of the display member and the supporting frame are spaced apart by the adhesive member to form a gap space therebetween, and the vibration apparatus may be disposed at or in the gap space.

According to some embodiments of the present disclosure, the vibration apparatus can comprise a first vibration apparatus and a second vibration apparatus, and both of the first vibration apparatus and the second vibration apparatus are disposed between the rear surface of the display member and the supporting frame.

According to some embodiments of the present disclosure, the first vibration apparatus and the second vibration apparatus may be spaced apart from each other by an interval or distance that is 35% to 40% (e.g., 37%) of a length of the first vibration apparatus or the second vibration apparatus.

According to some embodiments of the present disclosure, the display member can comprise a first display area, a second display area, and a third display area between the first display area and the second display area, and the first vibration apparatus and the second vibration apparatus can overlap the first display area.

According to some embodiments of the present disclosure, a lateral surface of the adhesive member surrounding and/or facing the gap space may have a curved shape. The curvature may be in a plane parallel to a surface of the display member for displaying an image, or may be in a plane perpendicular thereto.

According to some embodiments of the present disclosure, the gap space and/or the lateral surface of the adhesive member surrounding the gap space may have a circular shape or an oval shape.

An apparatus according to some embodiments of the present disclosure can comprise a display member configured to display an image, a supporting frame at a rear surface of the display member, an adhesive member between the supporting frame and the rear surface of the display member, the adhesive member including a hollow portion, and a vibration apparatus disposed at or in the hollow portion of the adhesive member and configured to vibrate the display member. The hollow portion may be also called a gap space.

According to some embodiments of the present disclosure, the display member can comprise a first display area, a second display area, and a folding area between the first display area and the second display area, and the hollow portion of the adhesive member can be disposed at each of the first display area and the second display area. That is, a hollow portion may be disposed at a rear side of the first display area and the second area, or a hollow portion may be respectively disposed at a rear side of the first display area and the second area. The folding area may be covered by the adhesive member. That is, no hollow portion may be provided in the folding area.

According to some embodiments of the present disclosure, the adhesive member may not be disposed in the folding area.

According to some embodiments of the present disclosure, the vibration apparatus can comprise a first vibration apparatus and a second vibration apparatus disposed in the hollow portion of the adhesive member disposed in an area overlapping with the first display area to vibrate the first display area of the display member, and a third vibration apparatus and a fourth vibration apparatus disposed in the hollow portion of the adhesive member disposed in an area overlapping with the second display area to vibrate the second display area of the display member.

According to some embodiments of the present disclosure, a total area of an area of the first vibration apparatus and an area of the second vibration apparatus can be equal to 25% to 31% (e.g., 28%) of the first display area. That is, the sum of an area of the first vibration apparatus and an area of the second vibration apparatus may be equal to 25% to 31% of the first display area. Here, area is to be understood in a plane parallel to the surface for displaying an image.

According to some embodiments of the present disclosure, a distance between each of the first vibration apparatus and the second vibration apparatus and the supporting frame can be equal to 0.5 to 3 times (e.g., 1.75 times) a thickness of each of the first vibration apparatus and the second vibration apparatus.

According to some embodiments of the present disclosure, a width of the adhesive member corresponding to the first display area can be equal to 10% to 30% (e.g., 20%) of a width of the first display area in the first direction, the portion of the adhesive overlapping with the first display area.

According to some embodiments of the present disclosure, the apparatus can further comprise a partition disposed between the rear surface of the display member and the supporting frame and/or between the first vibration apparatus and the second vibration apparatus. That is, the partition may extend between the display member and the supporting frame in the gap space or hollow portion.

According to some embodiments of the present disclosure, the apparatus can further comprise one or more pad members disposed between the supporting frame and at least one of the first vibration apparatus and the second vibration apparatus, respectively.

According to some embodiments of the present disclosure, each of the one or more pad members may include a material configured to absorb a vibration or adjust a vibration.

According to some embodiments of the present disclosure, each of the first vibration apparatus and the second vibration apparatus can comprise a bimorph structure.

According to some embodiments of the present disclosure, the vibration apparatus can comprise a circular shape, an oval shape, or a rounded shape.

According to some embodiments of the present disclosure, the vibration apparatus can be configured to be connected to the rear surface of the display member by a connection member.

According to some embodiments of the present disclosure, the vibration apparatus may comprise a first electrode portion, a second electrode portion, and a vibration portion disposed between the first electrode portion and the second electrode portion.

According to some embodiments of the present disclosure, the vibration apparatus can comprise a vibration portion, a first electrode portion at a first surface of the vibration portion, and a second electrode portion at a surface different from the first surface of the vibration portion.

According to some embodiments of the present disclosure, the vibration portion can comprise at least one or more of a piezoelectric inorganic material and a piezoelectric organic material.

According to some embodiments of the present disclosure, the vibration apparatus can comprise a plurality of first portions and a plurality of second portions disposed between the plurality of first portions, the plurality of second portions including an organic material, and each of the plurality of first portions can comprise one or more of a piezoelectric inorganic material and a piezoelectric organic material.

According to some embodiments of the present disclosure, the display member may comprise a front member, a rear member, and a display panel disposed between the front member and the rear member, the display panel including at least one pixel configured to display an image, and the vibration apparatus may be coupled to the rear member.

According to some embodiments of the present disclosure, the display member can comprise a display panel including a pixel configured to display an image, a front member over the display panel, and a rear member under the display panel, and the vibration apparatus can be configured to be connected to the rear member.

An apparatus according to some embodiments of the present disclosure may comprise a display member configured to display a video, a supporting frame, a vibration apparatus disposed between the display member and the supporting frame, and an adhesive member disposed between the supporting frame and the display member, the adhesive member being spaced apart from the vibration apparatus.

According to some embodiments of the present disclosure, the vibration apparatus may be spaced apart from the supporting frame.

According to some embodiments of the present disclosure, the vibration apparatus may be configured to output audio information synchronized with the video.

According to some embodiments of the present disclosure, an area of the vibration apparatus may be equal to 25% to 31% of the display area.

According to some embodiments of the present disclosure, the vibration apparatus may comprise a first vibration apparatus overlapping with a first display area of the display member, and a second vibration apparatus overlapping with a second display area of the display member.

According to some embodiments of the present disclosure, the display member may include a third display area between the first display area and the second display area, and the display member may be configured to bend at the third display area, and the first vibration apparatus and the second vibration apparatus may not overlap with the third display area.

According to some embodiments of the present disclosure, the adhesive member may have a closed loop shape surrounding the vibration apparatus.

According to some embodiments of the present disclosure, the adhesive member, the supporting frame and the display member may form a sound space, and the vibration apparatus may be disposed in the sound space.

According to some embodiments of the present disclosure, the vibration apparatus may comprise a first cover portion, a first adhesive layer, a first electrode portion, a vibration portion, a second electrode portion, a second adhesive layer, and a second cover portion, the vibration portion may be disposed between the first electrode portion and the second electrode portion, the first adhesive layer may be disposed between the first cover portion and the first electrode portion, and the second adhesive layer may be disposed between the second electrode portion and the second cover portion.

According to some embodiments of the present disclosure, the first electrode portion, the vibration portion and the second electrode portion may be enveloped by the first adhesive layer and the second adhesive layer.

According to some embodiments of the present disclosure, the vibration apparatus may be configured to vibrate in a direction toward the display member.

It will be apparent to those skilled in the art that various modifications and variations can be made in the present disclosure without departing from the scope of the present disclosure. Thus, it is intended that the present disclosure covers the modifications and variations of this disclosure provided they come within the scope of the appended claims and their equivalents.

What is claimed is:

1. An apparatus, comprising:
a display member configured to display an image;
a vibration apparatus disposed at a rear surface of the display member, wherein the vibration apparatus comprises:
a first vibration apparatus overlapping with a first display area of the display member; and
a second vibration apparatus overlapping with a second display area of the display member;
a supporting frame disposed at a rear surface of the vibration apparatus; and
an adhesive member disposed between the supporting frame and the rear surface of the display member, the adhesive member and/or supporting frame being spaced apart from the vibration apparatus,
wherein the vibration apparatus is configured to vibrate in a direction toward the display member,
wherein the display member includes a third display area between the first display area and the second display area, and the display member is configured to bend at the third display area, and wherein the first vibration apparatus and the second vibration apparatus do not overlap with the third display area.

2. The apparatus of claim 1, wherein the vibration apparatus is configured to vibrate the display member to output one or more of a sound and a haptic feedback.

3. The apparatus of claim 1, wherein the rear surface of the display member and the supporting frame are spaced apart by the adhesive member to form a gap space therebetween, and
wherein the vibration apparatus is disposed in the gap space.

4. The apparatus of claim 3, wherein a lateral surface of the adhesive member has a curved shape facing the gap space.

5. The apparatus of claim 3, wherein the gap space and/or the lateral surface of the adhesive member surrounding the gap space has a circular shape or an oval shape.

6. The apparatus of claim 1,
wherein both of the first vibration apparatus and the second vibration apparatus are disposed between the rear surface of the display member and the supporting frame.

7. The apparatus of claim 6, wherein the first vibration apparatus and the second vibration apparatus are spaced apart from each other by an interval that is 35% to 40% of a length of the first vibration apparatus or the second vibration apparatus.

8. The apparatus of claim 6,
wherein the first vibration apparatus and the second vibration apparatus face the first display area.

9. The apparatus of claim 8, wherein a total area of an area of the first vibration apparatus and an area of the second vibration apparatus is equal to 25% to 31% of the first display area.

10. The apparatus of claim 8, wherein a distance between each of the first vibration apparatus and the second vibration apparatus and the supporting frame is equal to 0.5 to 3 times a thickness of each of the first vibration apparatus and the second vibration apparatus.

11. The apparatus of claim 8, wherein a width of a portion of the adhesive member in a first direction is equal to 10% to 30% of a width of the first display area in the first direction, the portion of the adhesive member overlapping with the first display area.

12. The apparatus of claim 6, further comprising a partition disposed between the rear surface of the display member and the supporting frame and between the first vibration apparatus and the second vibration apparatus.

13. The apparatus of claim 6, further comprising one or more pad members disposed between the supporting frame and at least one of the first vibration apparatus and the second vibration apparatus, respectively.

14. The apparatus of claim 13, wherein each of the one or more pad members includes a material configured to absorb a vibration or adjust a vibration.

15. The apparatus of claim 6, wherein each of the first vibration apparatus and the second vibration apparatus comprises a bimorph structure.

16. The apparatus of claim 1, wherein the vibration apparatus comprises a circular shape, an oval shape, or a rounded shape.

17. The apparatus of claim 1, wherein the vibration apparatus is coupled to the rear surface of the display member by a connection member.

18. The apparatus of claim 1, wherein the vibration apparatus comprises:

a first electrode portion;
a second electrode portion; and
a vibration portion disposed between the first electrode portion and the second electrode portion.

19. The apparatus of claim 18, wherein the vibration portion comprises at least one or more of a piezoelectric inorganic material and a piezoelectric organic material.

20. The apparatus of claim 18, wherein the vibration apparatus comprises a plurality of first portions and a plurality of second portions disposed between the plurality of first portions, the plurality of second portions including an organic material, and
wherein each of the plurality of first portions comprises one or more of a piezoelectric inorganic material and a piezoelectric organic material.

21. The apparatus of claim 1, wherein the display member comprises:
a front member;
a rear member; and
a display panel disposed between the front member and the rear member, the display panel including a pixel configured to display an image, and
wherein the vibration apparatus is coupled to the rear member.

22. An apparatus, comprising:
a display member configured to display an image;
a supporting frame disposed at a rear surface of the display member;
an adhesive member disposed between the supporting frame and the rear surface of the display member, the adhesive member including a hollow portion; and
a vibration apparatus disposed in the hollow portion of the adhesive member and configured to vibrate the display member, wherein the vibration apparatus comprises:
a first vibration apparatus overlapping with a first display area of the display member; and
a second vibration apparatus overlapping with a second display area of the display member,
wherein the display member includes a third display area between the first display area and the second display area, and the display member is configured to bend at the third display area, and
wherein the first vibration apparatus and the second vibration apparatus do not overlap with the third display area.

23. The apparatus of claim 22, wherein the third display area is a folding area, and
wherein the hollow portion of the adhesive member overlaps with at least one of the first display area and the second display area.

24. The apparatus of claim 23, wherein the adhesive member is not disposed in the folding area.

25. The apparatus of claim 23,
the first vibration apparatus and the second vibration apparatus disposed are in the hollow portion of the adhesive member in an area overlapping with the first display area to vibrate the first display area of the display member, and
wherein the vibration apparatus further comprises a third vibration apparatus and a fourth vibration apparatus disposed in the hollow portion of the adhesive member in an area overlapping with the second display area to vibrate the second display area of the display member.

26. An apparatus, comprising:
a display member configured to display a video;
a supporting frame;
a vibration apparatus disposed between the display member and the supporting frame, wherein the vibration apparatus comprises:
a first vibration apparatus overlapping with a first display area of the display member; and
a second vibration apparatus overlapping with a second display area of the display member; and
an adhesive member disposed between the supporting frame and the display member, the adhesive member being spaced apart from the vibration apparatus,
wherein the display member includes a third display area between the first display area and the second display area, and the display member is configured to bend at the third display area, and
wherein the first vibration apparatus and the second vibration apparatus do not overlap with the third display area.

27. The apparatus of claim 26, wherein the vibration apparatus is spaced apart from the supporting frame.

28. The apparatus of claim 26, wherein the vibration apparatus is configured to output audio information synchronized with the video.

29. The apparatus of claim 26, wherein an area of the vibration apparatus is equal to 25% to 31% of the display area.

30. The apparatus of claim 26, wherein the adhesive member has a closed loop shape surrounding the vibration apparatus.

31. The apparatus of claim 26, wherein the adhesive member, the supporting frame and the display member form a sound space, and the vibration apparatus is disposed in the sound space.

32. The apparatus of claim 26, wherein the vibration apparatus comprises:
a first cover portion;
a first adhesive layer;
a first electrode portion;
a vibration portion;
a second electrode portion;
a second adhesive layer; and
a second cover portion,
wherein the vibration portion is disposed between the first electrode portion and the second electrode portion,
wherein the first adhesive layer is disposed between the first cover portion and the first electrode portion, and
wherein the second adhesive layer is disposed between the second electrode portion and the second cover portion.

33. The apparatus of claim 32, wherein the first electrode portion, the vibration portion and the second electrode portion are enveloped by the first adhesive layer and the second adhesive layer.

34. The apparatus of claim 26, wherein the vibration apparatus is configured to vibrate in a direction toward the display member.

* * * * *